(12) United States Patent
Zhodzishsky et al.

(10) Patent No.: US 8,373,593 B2
(45) Date of Patent: Feb. 12, 2013

(54) NAVIGATION RECEIVER FOR PROCESSING SIGNALS FROM A SET OF ANTENNA UNITS

(75) Inventors: Mark Zhodzishsky, Moscow (RU); Victor Veitsel, Moscow (RU); Vladimir Veitsel, Moscow (RU); Alexey Lebedinskiy, Moscow (RU)

(73) Assignee: Topcon GPS, LLC, Oakland, NJ (US)

( * ) Notice: Subject to any disclaimer, the term of this patent is extended or adjusted under 35 U.S.C. 154(b) by 363 days.

(21) Appl. No.: 12/766,024

(22) Filed: Apr. 23, 2010

(65) Prior Publication Data

US 2011/0012783 A1 Jan. 20, 2011

Related U.S. Application Data

(60) Provisional application No. 61/225,714, filed on Jul. 15, 2009.

(51) Int. Cl.
*G01S 19/35* (2010.01)
(52) U.S. Cl. .................................. 342/357.75
(58) Field of Classification Search ............... 342/357.75
See application file for complete search history.

(56) References Cited

U.S. PATENT DOCUMENTS

| | | | |
|---|---|---|---|
| 4,719,469 A | 1/1988 | Beier et al. | |
| 4,881,080 A | 11/1989 | Jablonski | |
| 5,268,695 A | 12/1993 | Dentinger et al. | |
| 5,917,448 A * | 6/1999 | Mickelson | 342/442 |
| 5,990,827 A * | 11/1999 | Fan et al. | 342/357.37 |
| 6,154,170 A | 11/2000 | Dentinger et al. | |
| 2006/0227905 A1 | 10/2006 | Kunysz et al. | |
| 2008/0198069 A1* | 8/2008 | Gronemeyer | 342/357.12 |
| 2009/0135060 A1 | 5/2009 | Lennon et al. | |

OTHER PUBLICATIONS

PCT International Search Report corresponding to PCT Application PCT/IB2010/001717 filed Jul. 8, 2010 (3 pages).
Written Opinion of the International Searching Authority corresponding to PCT Application PCT/IB2010/001717 filed Jul. 8, 2010 (6 pages).

* cited by examiner

*Primary Examiner* — Harry Liu

(57) ABSTRACT

A navigation receiver processes signals transmitted by global navigation satellites and received by a set of antenna units. Each antenna unit is connected to a separate input port of an antenna multiplexer switch. Satellite signals received from each antenna unit are consecutively switched to the input of a common radiofrequency processing module. A common signal correlator generates a common in-phase correlation signal from the satellite signals received from all the antenna units. The common in-phase correlation signal is processed by a data processing module to demodulate information symbols from the received satellite signals. The common in-phase correlation signal is also processed by phase-lock loops and delay-lock loops to generate carrier phases and code delays from the received satellite signals. Embodiments are described in which, along with the common in-phase correlation signal, common functional blocks or hardware are used to process the satellite signals received from all the antenna units.

33 Claims, 23 Drawing Sheets

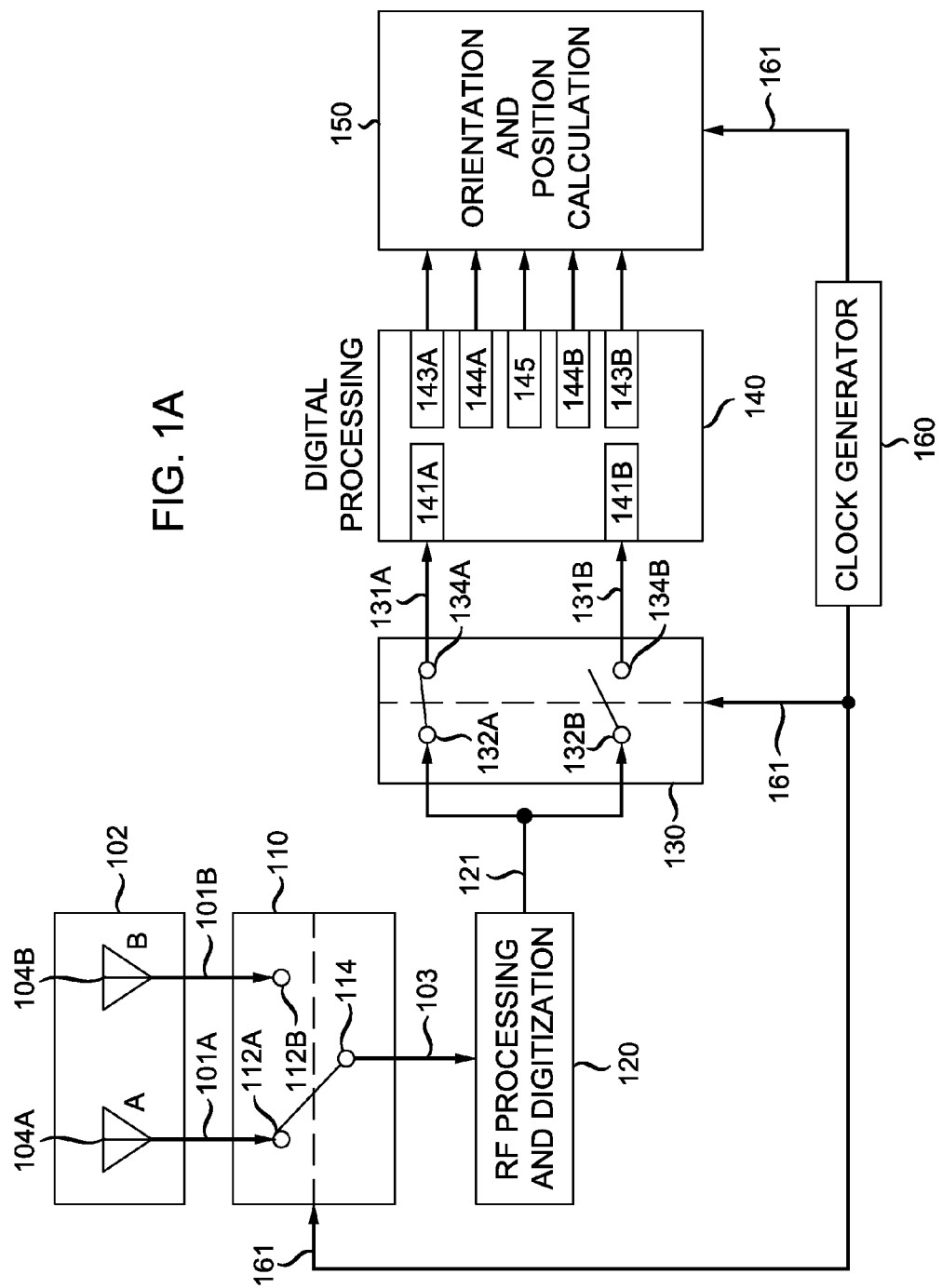

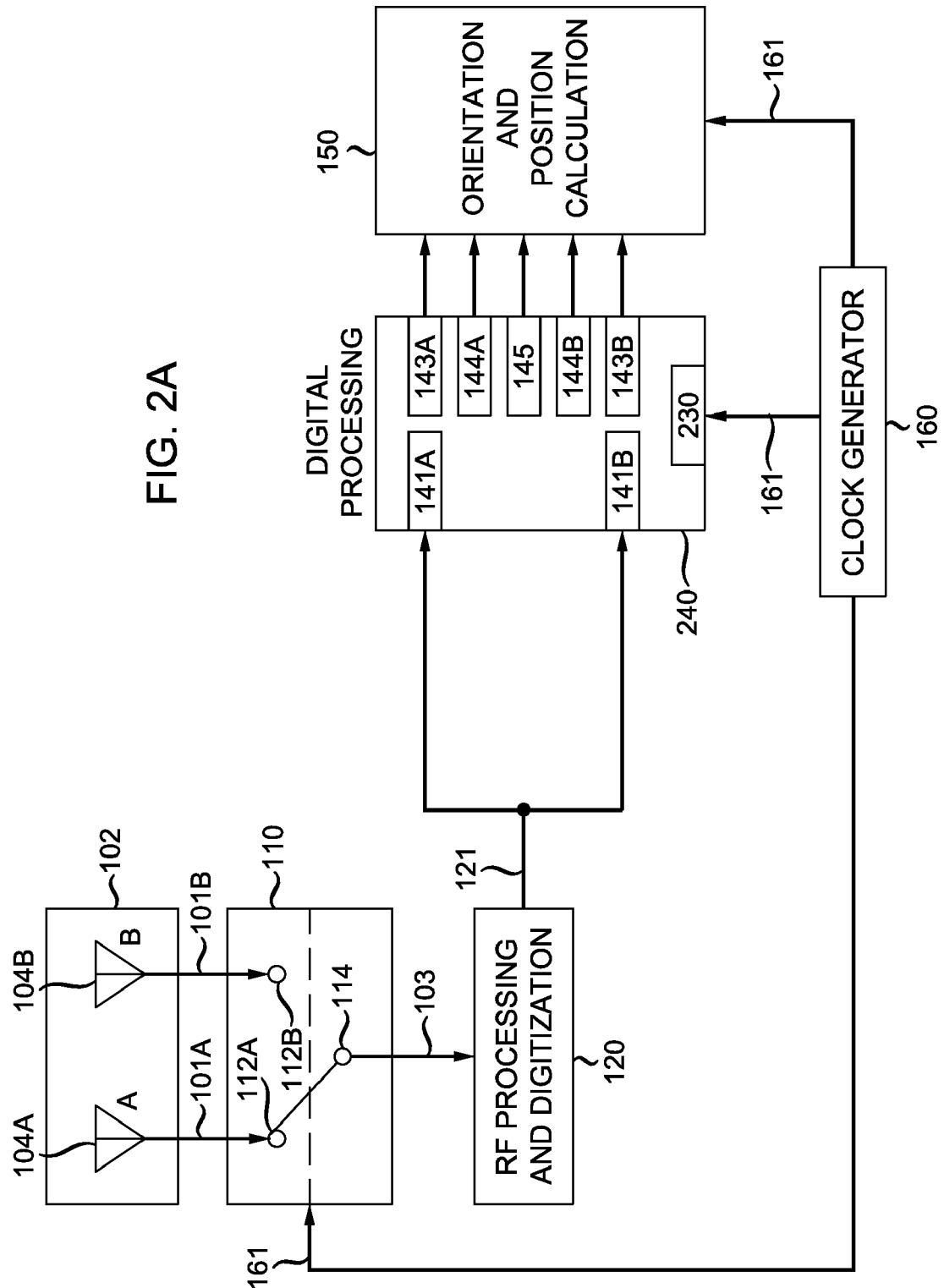

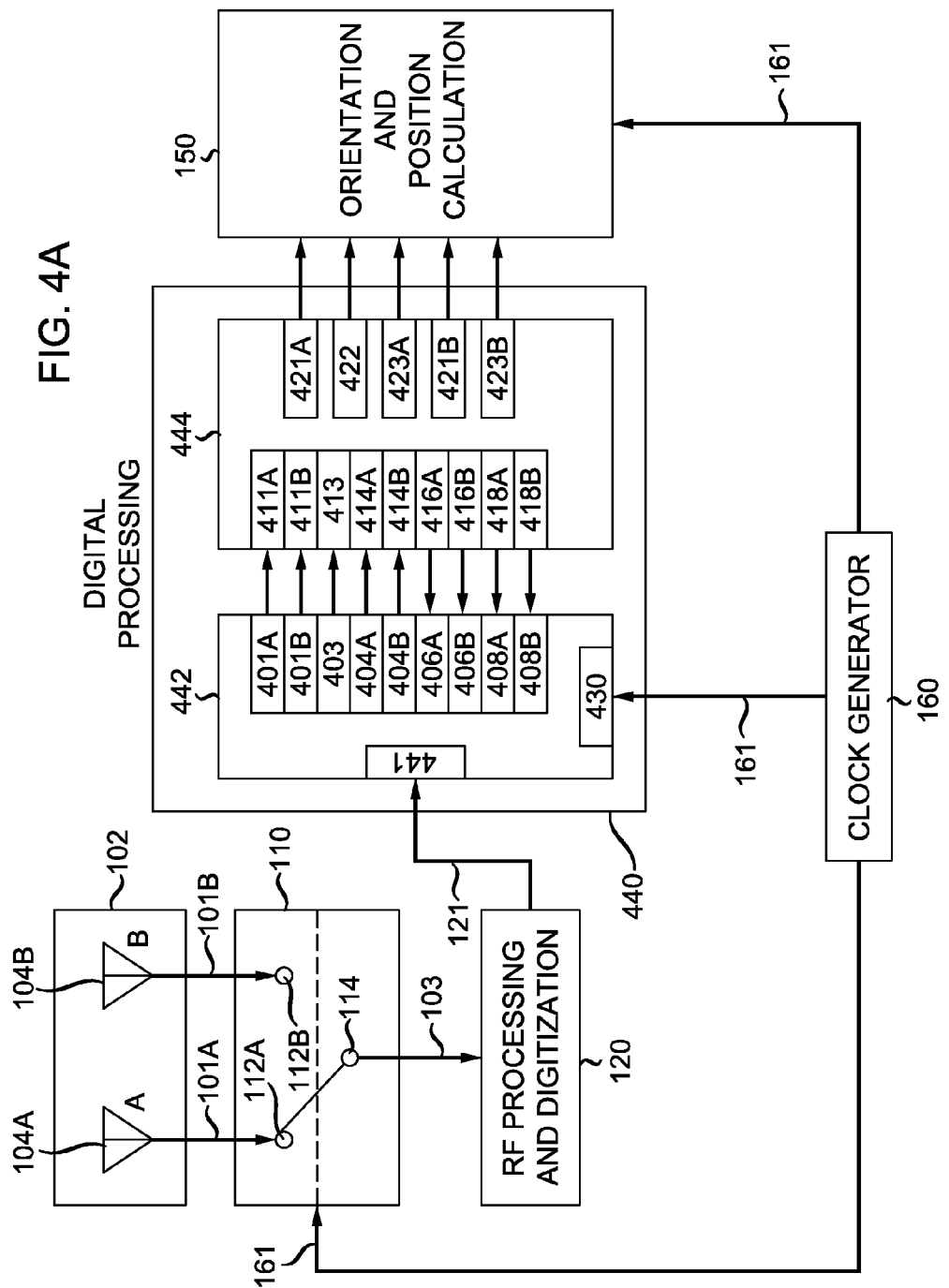

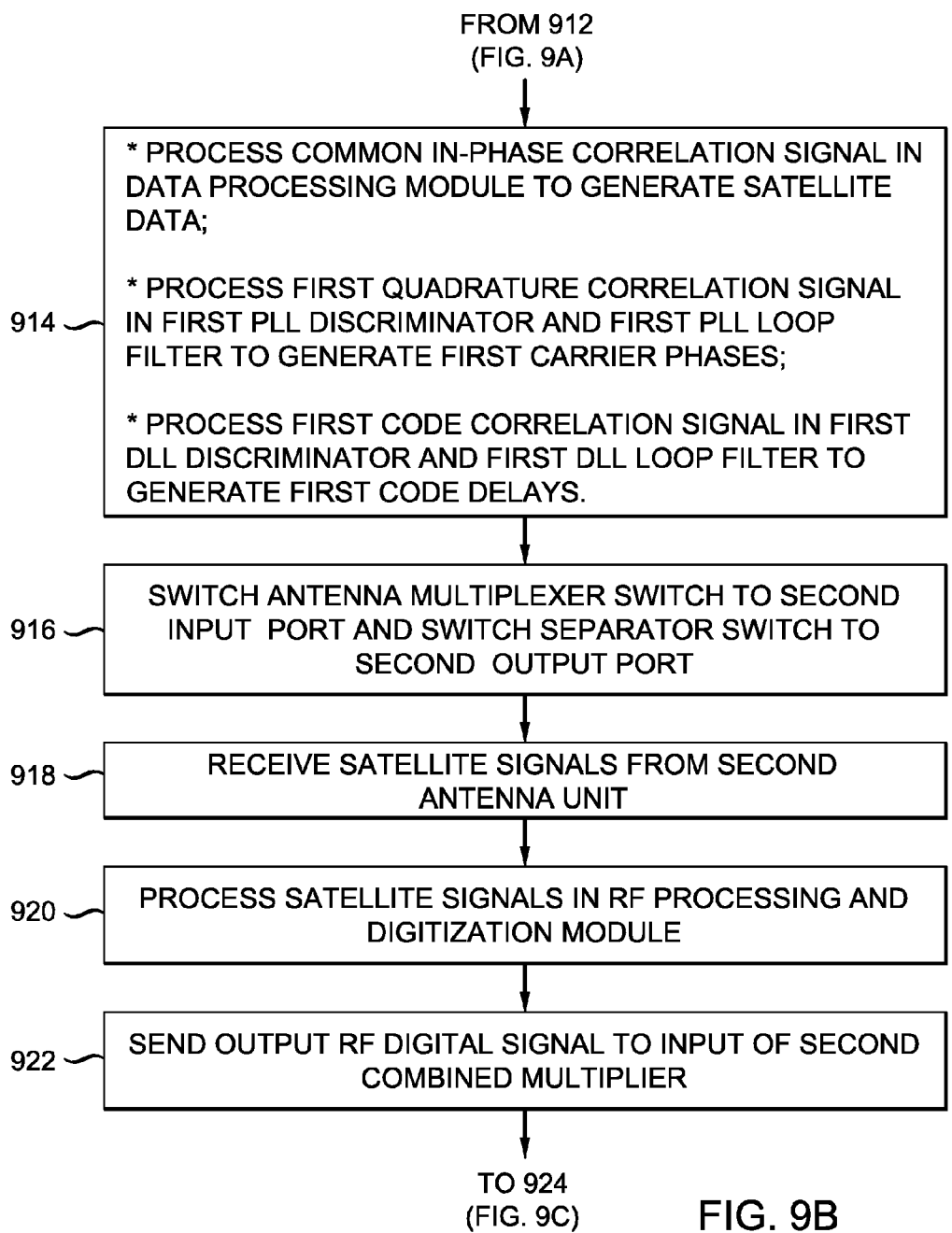

NAVIGATION RECEIVER FOR PROCESSING SIGNALS FROM A SET OF ANTENNA UNITS

This application claims the benefit of U.S. Provisional Application No. 61/225,714, filed Jul. 15, 2009, which is incorporated herein by reference.

BACKGROUND OF THE INVENTION

The present invention relates generally to global navigation satellite systems, and more particularly to navigation receivers for processing signals from a set of antenna units.

Global navigation satellite systems (GNSSs) may determine locations with high accuracy. Currently deployed global navigation satellite systems are the United States Global Positioning System (GPS) and the Russian GLONASS. Other global navigation satellite systems, such as the European GALILEO system, are under development. In a GNSS, a navigation receiver receives and processes radio signals transmitted by satellites located within a line-of-sight distance of the receiver. The satellite signals comprise carrier signals modulated by pseudo-random binary codes. The receiver measures the time delays of the received signals relative to a local reference clock or oscillator. Code measurements enable the receiver to determine the pseudo-ranges between the receiver and the satellites. The pseudo-ranges differ from the actual ranges (distances) between the receiver and the satellites due to various error sources and due to variations in the time scales of the satellites and the receiver. If signals are received from a sufficiently large number of satellites, then the measured pseudo-ranges can be processed to determine the code coordinates and coordinate time scales at the receiver. This operational mode is referred to as a stand-alone mode, since the measurements are determined by a single satellite receiver. A stand-alone system typically provides meter-level accuracy.

To improve the accuracy, precision, stability, and reliability of measurements, differential navigation (DN) systems have been developed. In a DN system, the position of a user is determined relative to a base station (also referred to as a base). In the measurement process, the coordinates of the base are known. The base contains a navigation receiver that receives satellite signals. The coordinates of the base are precisely known (by GNSS, other measurement schemes, or a combination of GNSS and other measurement schemes).

The user, whose position is to be determined, may be stationary or mobile and is often referred to as a rover. The rover also contains a navigation receiver that receives satellite signals. Signal measurements processed at the base are transmitted to the rover via a communications link. The communications link, for example, may be provided over a cable or optical fiber. To accommodate a mobile rover, the communications link is often a wireless link. The rover processes the measurements received from the base, along with measurements taken with its own receiver, to improve the accuracy of determining its position. Accuracy is improved in the differential navigation mode because errors incurred by the receiver at the rover and by the receiver at the base are highly correlated. Since the coordinates of the base are accurately known, measurements from the base may be used to compensate for the errors at the rover. A differential global positioning system (DGPS) computes locations based on pseudo-ranges only.

The location determination accuracy of a differential navigation system may be further improved by supplementing the code pseudo-range measurements with measurements of the phases of the satellite carrier signals. If the carrier phases of the signals transmitted by the same satellite are measured by both the navigation receiver in the base and the navigation receiver in the rover, processing the two sets of carrier phase measurements can yield a location determination accuracy to within several percent of the carrier's wavelength. A differential navigation system that computes locations based on real-time carrier signals (in addition to the code pseudo-ranges) is often referred to as a real-time kinematic (RTK) system. Processing carrier phase measurements to determine coordinates includes the step of ambiguity resolution; that is, determining the integer number of cycles in the carrier signal received by the navigation receiver from an individual satellite.

To measure the rover heading, an antenna platform may be mounted onto the rover. Several antennas separated from one another by user-specified distances are installed on this platform. Since the antenna platform is tightly mounted to the rover housing, the orientation of the set of antennas, which can be determined by receiver measurements, unambiguously fixes the rover heading as well.

When an individual antenna belongs to a set of antennas, the individual antenna is referred to as an antenna unit. Each antenna unit, independently of each other, receives a signal from all navigation satellites in view. The signals from all the antenna units are inputted to the navigation receiver, where they are processed by tracking systems. A set of measurements from all the antennas units and a number of satellites allows the determination of the coordinates of the set of antenna units and also the directions of lines between the separate antenna units (and, therefore, the directions of axes for the antenna platform). To determine three angles assigning the orientation of the platform plane, at least three antenna units are needed. To find the direction of one axis, two spaced-apart antenna units are sufficient.

Previous technical publications have described different systems for measuring angle coordinates based on signals from navigation satellites. For example, U.S. Pat. No. 4,881,080 describes a compass system and method for determining heading. The compass system includes two antennas located at a predetermined distance. Coordinates of each antenna are separately determined by different navigation (GPS) receivers. A microprocessor computes and displays a compass heading on a display unit based on the knowledge of the coordinates of the two antennas and the distance between them.

As the complexity of global navigation satellite systems has grown, the number of satellites in view at any instant has increased. Separate receiving and processing of signals transmitted from each satellite to each antenna unit would require complicated navigation receivers. To simplify receiver design, schemes have been developed that utilize successive switching of a part of the receiver to different antenna units; a set of measurements obtained at different time instants is used to determine heading. Such a method is described in U.S. Pat. No. 5,917,448, which describes a common switch that successively connects each antenna unit to a common receiver. The duration of time over which one antenna unit is connected to the receiver is such that all transient processes in tracking systems are over, and the energy to make code and phase measurements at a certain accuracy is stored to a sufficient degree. In this case, the speed of switching should not be high and is selected within a range of a few Hz; consequently, the orientation of an antenna platform cannot be accurately determined if the orientation is changing too quickly.

A number of patents, for instance, U.S. Pat. Nos. 5,268,695 and 6,154,170, specify one main (master) antenna and one auxiliary (slave) antenna. Only the master antenna has tracking systems, and it is used for determination of the rover coordinates. The slave antenna does not have tracking systems. Its phase measurements relative to reference signals being formed in tracking loops for the master antenna are equivalent to the phase difference of incoming signals in the master and slave antennas. Using measurements for a number of satellites, the phase differences allow heading determination of the set of antenna units.

U.S. Pat. No. 4,719,469 describes a heading system in which there is a common RF processing module for the separate antenna units and a separate independent phase-lock loop (PLL) for each antenna unit. The common RF processing module receives signals from the different antenna units at carrier frequency and converts them to an intermediate frequency. Each PLL at the intermediate frequency tracks the signal from a corresponding antenna unit and measures carrier phase. A switch synchronously switches the common RF processing module to the first antenna unit and first PLL and then to the second antenna unit and second PLL. Switching is sufficiently fast that each PLL practically simultaneously estimates carrier phase from each antenna unit. The phase difference between the first antenna unit and second antenna unit is calculated; based on this difference, the heading angle of the set of antenna units is computed. Note that only one of the antenna units provides a signal for the DLL, and rover coordinates are determined according to this antenna unit.

To determine the orientation of the set of antenna units, phase measurements from different antenna units, the mutual positions of which are known, are used in computations. Phase measurements according to signals from navigation satellites, however, are unambiguous only over ±π/2. To unambiguously determine orientation, it is necessary to resolve the ambiguities.

To perform this task, the following approaches may be used:
  A distance between antenna units is selected that is smaller than the wavelength of the received signal. This configuration provides an unambiguous phase difference measured by different antenna units.
  Antenna units are separated at a predetermined distance such that the phase difference ambiguities of one antenna pair can be resolved with measurements from another antenna pair. Such methods are well established in designing interferometers.
If the distance between antenna units is arbitrary, resolution of phase ambiguities can be obtained by methods of integer minimization that is often used in navigation receivers operating in the RTK mode. In this case, both phase and code measurements are utilized for each antenna unit. To resolve ambiguities, additional external, less-accurate, inclination sensors (such as a compass or an original checkpoint) may also be used.

What are needed are methods and apparatus for efficiently processing signals transmitted by a constellation of global navigation satellites and received by a set of antenna units. Navigation receivers that reduce the number of hardware components and efficiently utilize the received signal energy are advantageous.

BRIEF SUMMARY OF THE INVENTION

A navigation receiver processes signals transmitted by global navigation satellites and received by a set of antenna units. Each individual antenna unit is connected to an individual input port of an antenna multiplexer switch. Satellite signals received from each individual antenna unit are consecutively switched to a common output port of the antenna multiplexer switch. Satellite signals received from the output port are processed by a common radiofrequency processing module. A common signal correlator for different antenna units generates a common in-phase correlation signal from the radiofrequency-processed signal. The common in-phase correlation signal is processed by a data processing module to demodulate information symbols from the received satellite signals. The common in-phase correlation signal is also processed by phase-lock loops and delay-lock loops to generate carrier phases and code delays from the received satellite signals. The common in-phase correlation signal utilizes the total signal power received from all antenna units for further signal processing.

These and other advantages of the invention will be apparent to those of ordinary skill in the art by reference to the following detailed description and the accompanying drawings.

BRIEF DESCRIPTION OF THE DRAWINGS

FIG. 1A and FIG. 1B show a schematic of a navigation receiver in which signals from individual antenna units are separated at the inputs of multiple combined multipliers, and a common in-phase correlation signal is processed for phase-lock loop and delay-lock loop discriminators;

FIG. 2A-FIG. 2C show a schematic of a navigation receiver similar to that shown in FIG. 1A and FIG. 1B, except the signals from different antenna units are separated at the outputs of multiple combined multipliers within closed phase-lock loops and delay-lock loops;

FIG. 4A-FIG. 4C show a schematic of a navigation receiver in which signals from individual antenna units are processed by a common combined multiplier and common reference signal generators, and signals from individual antenna units are separated at the outputs of the combined multiplier within closed phase-lock loops and delay-lock loops;

DETAILED DESCRIPTION

Figure 1B:
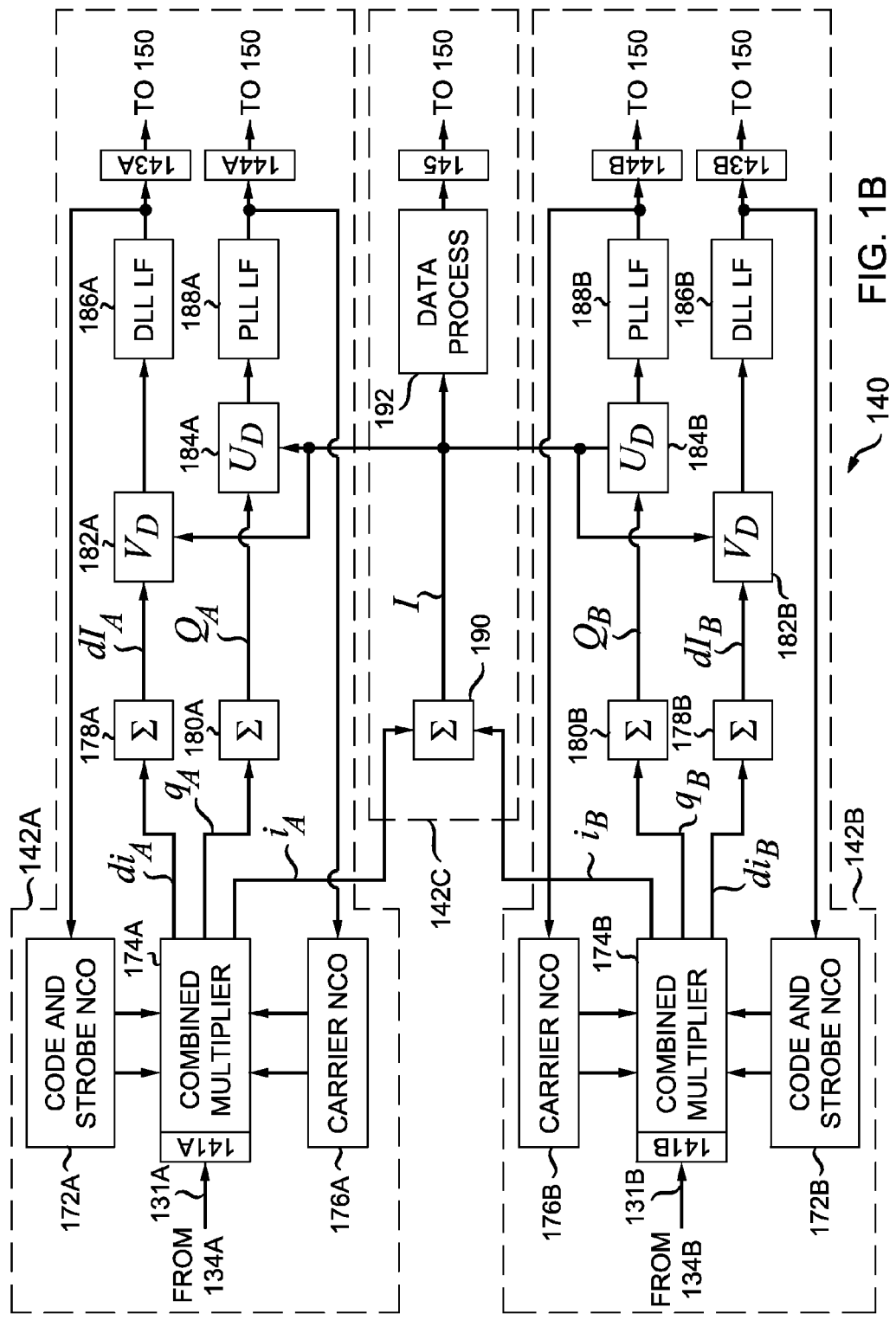

Each satellite in a global navigation satellite system may transmit signals on more than one frequency band (for example, one signal on the L1 frequency band and one signal on the L2 frequency band). A signal transmitted by a specific satellite on a specific frequency band constitutes a specific satellite channel. Satellite channels are processed in a navigation receiver as described below.

Radio signals received by an antenna are inputted into a radiofrequency (RF) processing and digitization block, which includes input amplifiers, filtering blocks, frequency converters, and analog-to-digital converters (ADCs). The digital signals are then processed in digital processing blocks for the satellite channels. The results of the digital processing are navigation data. Navigation data includes phase measurements, code measurements, and information symbols used for solving navigation tasks.

Herein a block refers to a functional block. A set of functional steps may be grouped into user-specified blocks and sub-blocks. Herein, a module refers to a user-specified set of hardware, firmware, and software which implements (executes) a user-specified set of functional steps. The same set of functional steps may be implemented by different user-specified modules (that is, different combinations of hardware, firmware, and software).

Processing steps that require high-speed execution are typically performed by hard-wired circuits [for example, application-specific integrated circuits (ASICs) and field-programmable gate arrays (FPGAs)] and firmware. Processing steps that do not require high-speed execution are typically performed by a computational system including a microprocessor that executes firmware-defined or software-defined program instructions. The computational system is typically integrated into the navigation receiver.

In processing each channel, two tracking systems track changes in parameters of the received signal. The first tracking system, referred to as the delay-lock loop (DLL), tracks changes in the pseudo-random number (PRN) modulation code delay of the received signal. The second tracking system, referred to as the phase-lock loop (PLL), tracks changes in the carrier phase of the received signal.

In a tracking system, the input signal is multiplied by different reference signals generated in the receiver, and the multiplication products are accumulated. Devices that perform multiplication are referred to as multipliers. Devices that perform several combinations of multiplications are referred to as combined multipliers. Devices that perform accumulation are referred to as accumulators or counters. Devices that perform multiplication followed by accumulation are referred to as correlators. The output of a correlator is the cross-correlation function of the input signal and the reference signal; for simplicity, the output is referred to as the correlation signal.

A satellite channel is typically processed via three parallel processing paths. The first path calculates the in-phase correlation signal I. This signal is obtained when the reference signal in the correlator is in-phase relative to the incoming signal carrier. The reference code in the reference signal is a replica of the PRN code modulating the incoming signal. The output of this correlator (correlator-I) is the in-phase correlation signal I.

The phase of the reference signal can differ from that of the carrier phase of the incoming signal; similarly, the reference code delay can differ from the modulation code delay of the incoming signal. If the phase shift between the phase of the reference carrier and the phase of the incoming carrier is denoted as $\phi$, and the time shift between the code delay time of the reference code and the code delay time of the incoming signal is denoted as $\tau$, then the in-phase correlation signal I can be approximated by:

$$I = k \cdot U_S \cdot \mu \cdot R_o(\tau) \cdot \cos(\phi) + I_{in} \quad \text{(E1)}$$

where:
$R_o(\tau)$ is the normalized cross-correlation function of the incoming PRN code after filtering in the receiver RF module and a reference code which is a locally generated copy of the PRN code modulating the incoming signal;
$U_S$ is the amplitude of the incoming signal;
$\mu = \pm 1$ is the binary information symbol modulating the incoming signal;
k is a proportionality coefficient; and
$I_{in}$ is the interference at the output of correlator-I caused by additive interference at the receiver input.

The second correlator (correlator-Q) calculates the quadrature correlation signal Q. This signal is obtained when the second reference carrier is shifted by $\pi/2$ from the first reference carrier. The reference code is the same as the one in the first correlator (correlator-I). The quadrature correlation signal Q formed at the output of correlator-Q can be approximated by:

$$Q = k \cdot U_S \cdot \mu \cdot R_o(\tau) \cdot \sin(\phi) + Q_{in} \quad \text{(E2)}$$

where $Q_{in}$ is the interference at the output of correlator-Q caused by additive interference at the receiver input.

The third correlator (correlator-dI) calculates the code correlation signal dI that is used to generate an error signal to control the system tracking modulation code delays (DLL). To obtain this signal, the first reference carrier, in-phase with the input carrier, and a reference code that consists of a sequence of short strobe pulses (strobe sequence) are used. Strobe pulses correspond to the changes of sign of input PRN-code elements (chips). Note that the sign of a strobe pulse matches the sign of a chip which follows the strobe pulse. The code correlation signal dI can be approximated by:

$$dI = k \cdot U_S \cdot \mu \Delta R_o(\tau) \cdot \cos(\phi) + dI_{in} \quad \text{(E3)}$$

where $\Delta R_o(\tau)$ is the cross-correlation function of the incoming PRN code after passing through the receiver filter and the reference code generated in the form of a sequence of short strobe pulses, and $dI_{in}$ is the interference at the output of correlator-dI caused by the additive interference at the receiver input.

In the process of receiver operation, values in expressions (E1)-(E3) are changed, and the corresponding correlation signals are changed respectively. Correlation signals I, Q, and dI are used for coordinating (co-working) the PLL and DLL tracking systems.

Expressions (E1)-(E3) hold under the condition that PLL errors $\phi$ and DLL errors $\tau$ remain practically the same over the time (duration) of accumulating in correlators. In tracking mode, this condition is true to an adequate accuracy. In addition, in tracking mode, values $\phi$ and $\tau$ are small, and $R_o(\tau) \cdot \cos(\phi) \cong 1$. From (E1), it follows that the in-phase correlation signal I produces a binary information symbol sequence $\mu = \pm 1$. These symbols convey messages from the navigation satellites to the navigation receiver. The messages include satellite data on satellite coordinates, expected parameters of signal propagation, and other information that is used for coordinate determination.

The PLL and DLL digital tracking systems are implemented by closed circuits comprising four main components: correlator, discriminator, loop filter, and numerically-controlled oscillator (NCO). Depending on the purpose and type of the tracking system (PLL or DLL), these tracking systems use the I, Q, or dI correlation signals in different combinations. The correlators include combined multipliers that multiply the incoming signal by corresponding reference signals and accumulators that accumulate corresponding multiplication products over a specified time interval. Combined multipliers multiply the incoming signal by an in-phase reference carrier and reference code, by a quadrature reference carrier and reference code, and by an in-phase reference carrier and reference strobe.

A typical PLL discriminator forms an error signal $U_D$ according to the algorithm:

$$U_D = \operatorname{arctg}(Q/I) \quad (E4)$$

From (E1), (E2), and (E4), error signal $U_D$ is proportional to error $\phi$ within $\pm\pi/2$, and then it periodically repeats. The mean value of $U_D(\phi)$ forms the PLL discriminator characteristic. The error signal is inputted to the loop filter, which in turn outputs a control signal and closes the PLL circuit, thereby controlling the frequency and phase of the PLL reference signal carrier NCO (also referred to as the carrier NCO). The carrier NCO produces reference signals for correlator-I and correlator-Q.

The DLL circuit operates in a similar way and includes similar components. The DLL discriminator forms tracking error $V_D$ using the algorithm:

$$V_D = dI/I \quad (E5)$$

The DLL reference signal code and strobe NCO (also referred to as the code and strobe NCO) generates two reference signals (reference oscillations) for the correlator-dI: one oscillation (code reference signal or code reference oscillation) in the form of a modulation code replica (or code sequence) to generate the in-phase correlation signal I, and the other (strobe reference signal or strobe reference oscillation) in the form of a strobe sequence which is sent to correlator-dI.

Discriminators operating according to expressions (E4) and (E5) can be modified if the in-phase correlation signal I is subjected to a preliminary smoothing process to reduce the interference component $I_{in}$. Smoothing the in-phase correlation signal I increases the operational stability of the tracking loops at low signal-to-noise ratios.

The PLL tracking system tries to make the tracking error $\phi$ equal to zero. As a result, one of the reference signals generated by the carrier NCO will be in-phase with the incoming signal, and its phase can be used to estimate the carrier phase of the incoming signal. Such an estimate is called a phase measurement of the receiver.

The DLL tracking system tries to reduce the tracking error $\tau$ to zero. As a result, reference signals generated by the code and strobe NCO will correspond to the modulation code of the incoming signal. Delays of these reference signals can be used to estimate modulation code time delay of the incoming signal. Such an estimate is called a code measurement of the receiver.

Phase and code measurements obtained from signals of a number of satellites are used to determine coordinates and receiver speed. Due to external effects on tracking systems, the tracking errors fluctuate close to steady balance points in which error signals are equal to zero. At normal conditions in tracking modes, these errors are negligible. One source of tracking errors is the inertia of the tracking system. Another source of tracking errors is external radio interference that causes interference (in particular, noise) errors. Both types of errors depend on the inertia of the tracking system. In the tracking mode, the inertia can be estimated by the bandwidth of the equivalent filter, operation of which is equivalent to the corresponding tracking circuit (loop). The bandwidth of this filter characterizes the inertia of the tracking system and its filtering parameters. The bandwidth should be chosen based on a trade off between dynamic and noise errors.

When a navigation receiver receives satellite signals from a set of antenna units, the navigation receiver also calculates the orientation of the set of antenna units. If the set of antenna units includes only two antenna units, the orientation is determined by two angles specifying the orientation of a base line between the two antenna units. If the set of antenna units includes three antenna units, the orientation is determined by three angles specifying the orientation of a base plane passing through the three antenna units. The accuracy of determining the angles increases as the distances between antenna units increase.

One of several embodiments of a navigation system is shown in FIG. 1A and FIG. 1B. FIG. 1A shows the overall architecture of a navigation system comprising a set of antenna units and a navigation receiver. The set of antenna units 102 includes antenna unit A 104A and antenna unit B 104B. The antenna units are spaced apart (spatially separated by a distance). To simplify the discussion and figures, the set of antenna units 102 is shown with only two antenna units. In general, however, the set of antenna units 102 may have N antenna units, where N is an integer greater than or equal to 2. The RF signal 101A (corresponding to satellite signals received from multiple global navigation satellites) received from antenna unit 104A is fed into input port 112A of antenna multiplexer switch 110. Similarly, the RF signal 101B (corresponding to satellite signals received from multiple global navigation satellites) received from antenna unit 104B is fed into input port 112B. In general, antenna multiplexer switch 110 has N input ports, one for each of the N antenna units.

The output RF signal 103 from output port 114 of antenna multiplexer switch 110 is fed into RF processing and digitization block 120, where RF processing and digitization block 120 refers to a functional block. As discussed above, the RF processing and digitization block is implemented by a RF processing and digitization module. The output RF signal 103 is sequentially switched between input RF signal 101A and input RF signal 101B in response to clock signal 161 from clock generator 160.

The output RF-processed and digitized signal 121 from RF processing and digitization block 120 is fed simultaneously into input port 132A and input port 132B of separator switch 130. To simplify the terminology, output RF-processed and digitized signal 121 is also referred to as output RF digital signal 121. Herein, the output RF digital signal comprises output RF digital segments, each specific output RF digital segment corresponding to a specific antenna unit. The circuit path between input port 132A and output port 134A of separator switch 130 is opened/closed in response to clock signal 161. Similarly, the circuit path between input port 132B and output port 134B of separator switch 130 is closed/opened in response to clock signal 161.

Operation of antenna multiplexer switch 110 and separator switch 130 is synchronized. When antenna multiplexer switch 110 is switched to input port 112A, separator switch 130 is switched such that the circuit path between input port 132A and output port 134A is closed, and the circuit path between input port 132B and output port 134B is open. Similarly, when antenna multiplexer switch 110 is switched to input port 112B, separator switch 130 is switched such that the circuit path between input port 132A and output port 134A is open, and the circuit path between input port 132B and output port 134B is closed. The output signal 131A from output port 134A is fed into input port 141A of digital processing block 140, where digital processing block 140 refers to a functional block. Similarly, the output signal 131B from output port 134B is fed into input port 141B of digital processing block 140.

Output 143A, output 144A, output 145, output 144B, and output 143B of digital processing block 140 are fed into orientation and position calculation block 150, where orientation and position calculation block 150 refers to a functional block. Clock signal 161 is also inputted into orientation and position calculation block 150.

Details of orientation and position calculation block 150 are not provided, since well-known techniques can be used to calculate orientation and position from the input values. Methods for calculating positions are discussed, for example, in B. W. Parkinson and J. J. Spilker, "Global Positioning System: Theory and Application," American Institute of Aeronautics and Astronautics, Washington D.C., 1996, and B. Hofmann-Wellenhof, H. Lichtenegger, and J. Collins, "Global Positioning System: Theory and Practice," Springer, Wien/NewYork, 1992. Methods for calculating orientations are based on the fact that the phase difference $\Delta\phi$ is related to angle $\theta$ according to $\lambda \cdot \Delta\phi = 2 \cdot \pi \cdot L \cdot \cos(\theta) = 2 \cdot \pi \cdot L \cdot \cos(\epsilon) \cdot \cos(\beta)$, where $\lambda$ is the wavelength, $\Delta\phi$ is the phase difference between two antennas, L is the distance between two antennas (the modulus of the vector $\vec{L}$ which connects two antennas), $\theta$ is the spatial angle between the signal reception vector and the vector between two antennas, and $(\epsilon,\beta)$ are the orientation angles (elevation and azimuth angles) of vector $\vec{L}$. A solution of a set of the equations with measurements for different satellites can help in finding angles $\epsilon$ and $\beta$. Methods for ambiguity resolution are described, for example, in U.S. Pat. No. 7,102,563.

FIG. 1B shows a functional schematic of digital processing block 140. Digital processing block 140 includes delay-lock loop (DLL) tracking systems for measuring code delays and phase-lock loop (PLL) tracking systems for measuring carrier phase. Separate DLL and PLL tracking systems are provided for input signals from antenna unit A 104A and antenna unit B 104B. Herein, systems and system elements (including functional blocks, sub-blocks, and components) correspond to satellite signals received by antenna unit A 104A if they process input signals from antenna unit A 104A. Similarly, systems and system elements (including functional blocks, sub-blocks, and components) correspond to satellite signals received by antenna unit B 104B if they process input signals from antenna unit B 104B.

Digital processing block 140 is partitioned into three digital processing sub-blocks. Digital processing sub-block 142A is dedicated to processing signals from antenna unit A 104A. Digital processing sub-block 142B is dedicated to processing signals from antenna unit B 104B. Note that corresponding elements in digital processing sub-block 142A and digital processing sub-block 142B are labelled XXXA and XXXB, respectively, where XXX is a three-digit reference number. Digital processing sub-block 142C is a common digital processing sub-block that processes signals from both antenna unit A 104A and antenna unit B 104B.

The tracking systems for the signals from antenna unit A 104A are implemented by digital processing sub-block 142A and digital processing sub-block 142C. The tracking systems for the signals from antenna unit B 104B are implemented by digital processing sub-block 142B and digital processing sub-block 142C. The tracking systems for signals from antenna unit A 104A are described below. A similar description applies for the tracking systems for signals from antenna unit B 104B.

Refer to FIG. 1A. In response to clock signal 161, antenna multiplexer switch 110 is set to select input RF signal 101A from antenna unit 104A for processing in RF processing and digitization block 120. The output RF digital signal 121 from RF processing and digitization block 120 is then selected by separator switch 130 for processing in digital processing block 140.

Refer to FIG. 1B. Output signal 131A from separator switch 130 is inputted into input 141A of combined multiplier 174A, which also receives reference signals from carrier numerically controlled oscillator (NCO) 176A and reference signals from code and strobe NCO 172A. Combined multiplier 174A multiplies input signal 131A by an in-phase reference code. The corresponding output of combined multiplier 174A is labelled $i_A$ and referred to as the in-phase multiplier output. The in-phase multiplier output $i_A$ is accumulated in accumulator 190. In FIG. 1B, and other figures, the $\Sigma$ symbol refers to an accumulator. The output of accumulator 190 is the in-phase correlation signal I, which is inputted into data processing module 192, DLL discriminator 182A, DLL discriminator 182B, PLL discriminator 184A, and PLL discriminator 184B. Further processing of I is described below. The output of data processing module 192 is sent to orientation and position calculation block 150.

Combined multiplier 174A multiplies the input signal 131A by a quadrature-phase reference carrier. The corresponding output of combined multiplier 174A is labelled $q_A$ and referred to as the quadrature multiplier output. The quadrature multiplier output $q_A$ is accumulated in accumulator 180A. The output of accumulator 180A is the quadrature correlation signal $Q_A$, which is inputted into PLL discriminator 184A. In FIG. 1B, and other figures, the $U_D$ symbol refers to a PLL discriminator. The output of PLL discriminator 184A is inputted into PLL loop filter (LF) 188A. The output of PLL loop filter 188A is sent to orientation and position calculation block 150. The output of PLL loop filter 188A is also sent as an input control signal to carrier NCO 176A.

Combined multiplier 174A multiplies input signal 131A by strobe pulses. The corresponding output of combined multiplier 174A is labelled $di_A$ and referred to as the code multiplier output. The code multiplier output $di_A$ is accumulated in accumulator 178A. The output of accumulator 178A is the code correlation signal $dI_A$, which is inputted into DLL discriminator 182A. In FIG. 1B, and other figures, the $V_D$ symbol refers to a DLL discriminator. The output of DLL discriminator 182A is inputted into DLL loop filter 186A. The output of DLL loop filter 186A is sent to orientation and position calculation block 150. The output of DLL loop filter 186A is also sent as an input control signal to code and strobe NCO 172A.

Combined multiplier 174A, carrier NCO 176A, code and strobe NCO 172A, accumulator 178A, accumulator 180A, and accumulator 190 are typically implemented in hardware [for example, in application-specific integrated circuits (ASICs)] for high-speed operation. PLL discriminator 184A, DLL discriminator 182A, PLL loop filter 188A, and DLL loop filter 186A typically operate at a sufficiently low speed that they may be implemented by a microprocessor.

In the embodiment shown in FIG. 1B, there are five accumulators. Two are dedicated for processing signals from antenna unit A 104A: accumulator 178A for $dI_A$ and accumulator 180A for $Q_A$. Similarly, two are dedicated for processing signals from antenna unit B 104B: accumulator 178B for $dI_B$ and accumulator 180B for $Q_B$. Accumulator 190, however, stores the in-phase correlation signal I from both antenna unit 104A and antenna unit B 104B.

When the PLL and DLL are operating in steady-balance tracking modes, the in-phase correlation signal I does not substantially depend on the antenna unit selected; therefore, irrespective of the switching state of antenna multiplexer switch 110 and separator switch 130, I can be averaged over time intervals considerably exceeding the operational period of the clock generator 160. Using a common accumulator 190 for the in-phase correlation signal I, and averaging its value over a symbol duration, enables the total signal energy received by the set of antenna units 102 to be utilized for isolating information symbols in data processing block 192. The output of the common accumulator 190 is referred to herein as the common in-phase correlation signal I.

The common in-phase correlation signal I from accumulator 190 is also inputted into PLL discriminator 184A, DLL discriminator 182A, PLL discriminator 184B, and DLL discriminator 182B for generating PLL and DLL discrimination characteristics. As discussed earlier, to enhance operational stability of the tracking loops at low signal-to-noise ratios, the common in-phase correlation signal I may be processed by an additional smoothing step (not shown). The use of a common accumulator 190 for the common in-phase correlation signal I also allows utilization of the total signal energy received by the set of antennas 102; therefore, the operational stability of the PLL and the DLL at low signal-to-noise ratios is further increased.

The following outputs are generated by digital processing block 140:

Output 143A from DLL loop filter 186A is the set of code delay measurements for antenna unit A 104A;
Output 144A from PLL loop filter 188A is the set of carrier phase measurements for antenna unit A 104A;
Output 143B from DLL loop filter 186B is the set of code delay measurements for antenna unit B 104B;
Output 144B from PLL loop filter 188B is the set of carrier phase measurements for antenna unit B 104B; and
Output 145 from data processing block 192 is the set of satellite data.

These outputs are sent to orientation and position calculation block 150 (FIG. 1A), which calculates the orientation and position of the rover on which the set of antenna units 102 are mounted.

As discussed above, the generation of a common in-phase correlation signal I for multiple antenna units is implemented when the tracking systems operate in a steady-balance mode. The lock-on mode precedes the steady-balance mode. In the lock-on mode, the common in-phase correlation signal I does not need to be used: for each individual antenna unit, the corresponding individual in-phase correlation signal is used for signal acquisition by the corresponding individual tracking system.

Figure 2B:
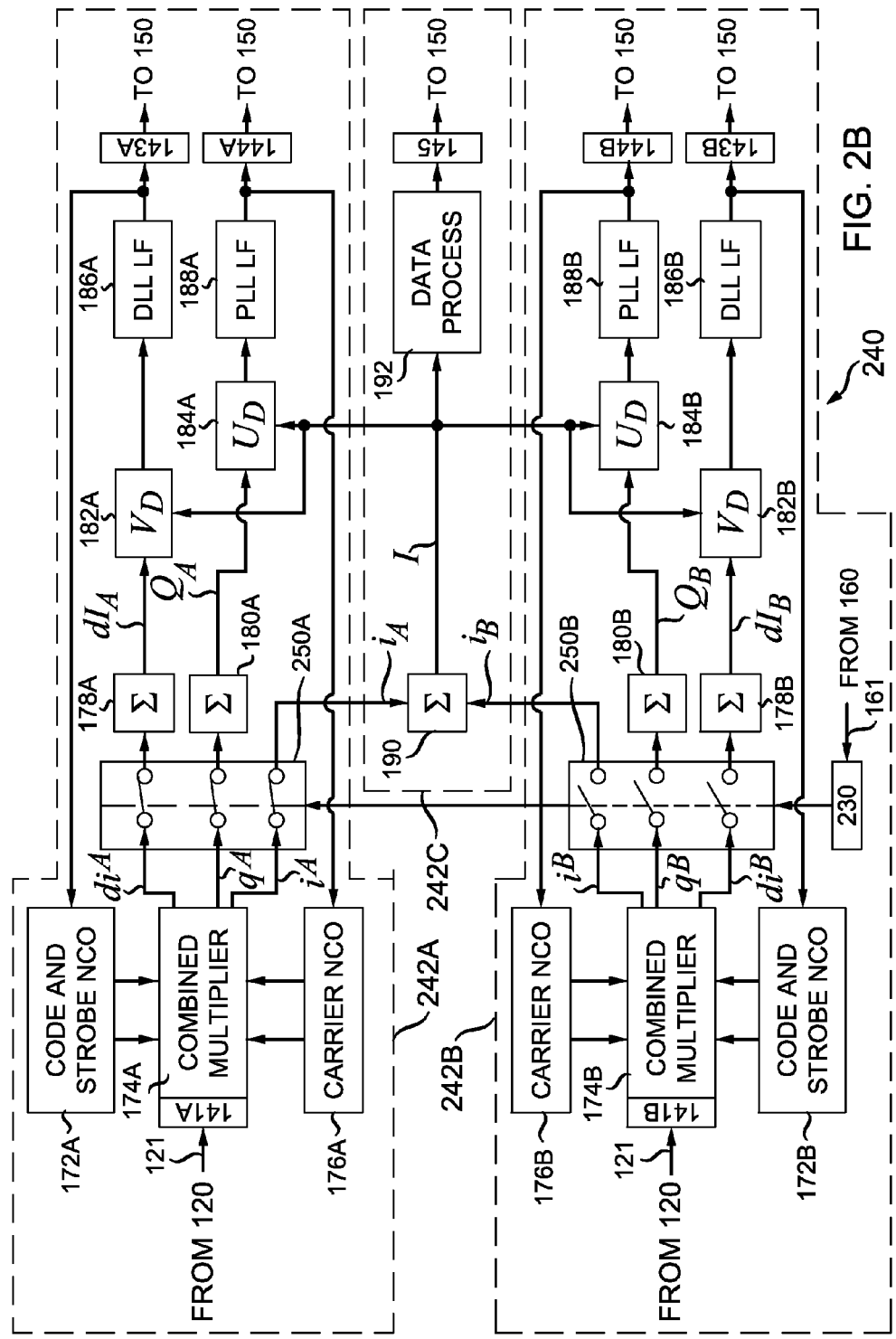

Another embodiment is shown in FIG. 2A and FIG. 2B. The overall system architecture, shown in FIG. 2A, is similar to the overall system architecture shown previously in FIG. 1A. In this embodiment, the output RF digital signal 121 from RF processing and digitization block 120 is fed simultaneously into input 141A and input 141B of digital processing block 240. Output 143A, output 144A, output 145, output 144B, and output 143B from digital processing block 240 are sent to orientation and position calculation block 150. As described in detail below, the inputs and outputs of digital processing block 240 are the same as those of digital processing block 140; therefore, they are labelled by the same reference numbers. Clock signal 161 is inputted into input 230 of digital processing block 240.

Refer to FIG. 2B. The architecture of digital processing block 240 is similar to that of digital processing block 140 (FIG. 1B). Digital processing block 240 is partitioned into three digital processing sub-blocks. Digital processing sub-block 242A is dedicated to processing signals from antenna unit A 104A. Digital processing sub-block 242B is dedicated to processing signals from antenna unit B 104B. Digital processing sub-block 242C is a common sub-block that processes signals from both antenna unit A 104A and antenna unit B 104B.

The digital processing in digital processing block 240 is similar to that in digital processing block 140. Only the differences are described. In FIG. 2B, the output RF digital signal 121 from RF processing and digitization block 120 is inputted simultaneously into input 141A of combined multiplier 174A and input 141B of combined multiplier 174B. Refer now to the digital processing within digital processing sub-block 242A. The outputs of combined multiplier 174A, labelled in-phase multiplier output $i^A$, quadrature multiplier output $q^A$, and code multiplier output $di^A$, are fed into input ports of separator switch 250A. As shown in FIG. 2A, the output RF digital signal 121 from RF processing and digitization block 120 is fed into input 141A of combined multiplier 174A irrespective of the switching state of antenna multiplexer switch 110. Separation of multiplier outputs derived from antenna unit A 104A and from antenna unit B 104B is performed by separator switch 250A. Herein, each multiplier output comprises multiplier output segments, each specific multiplier output segment corresponding to a specific antenna unit.

Figure 2C:
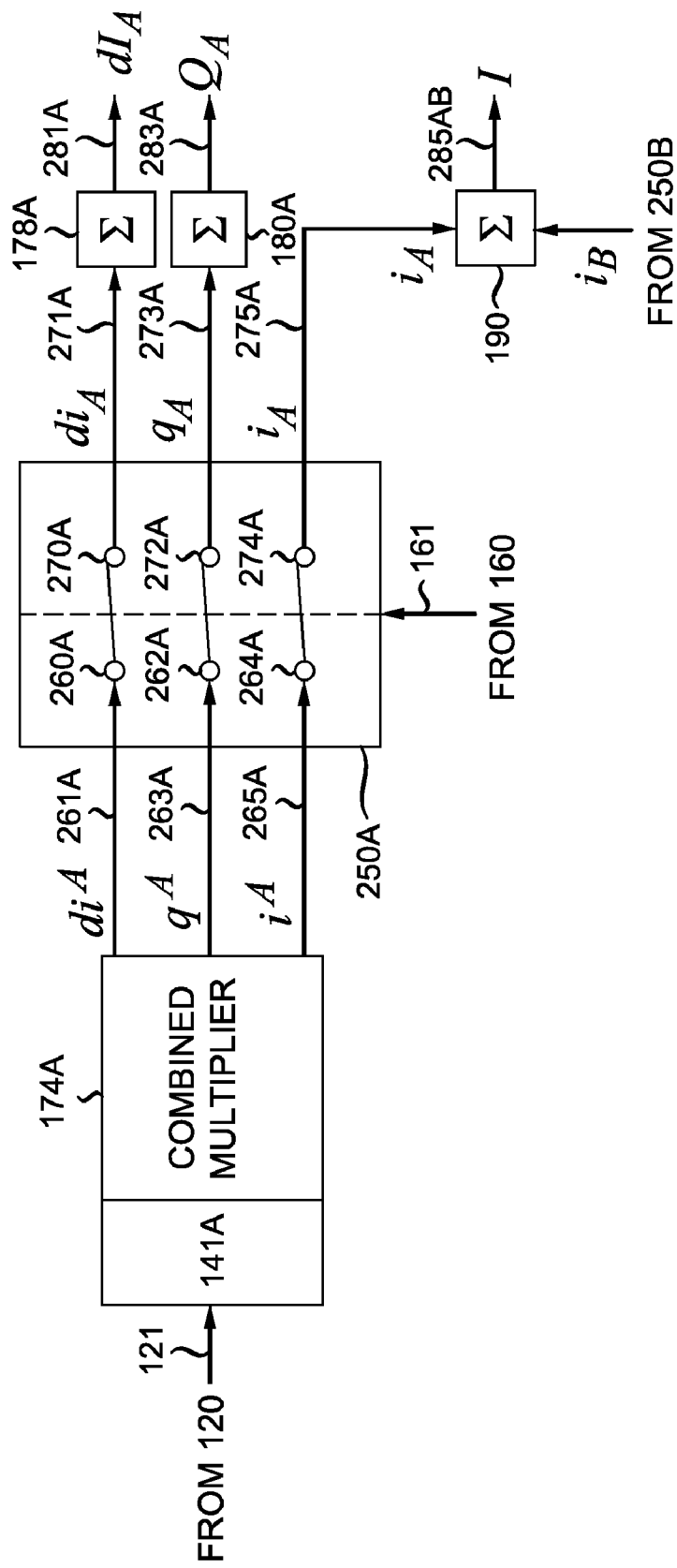

When signals from antenna unit A 104A are tracked, separator switch 250A is closed, and separator switch 250B is open. FIG. 2C shows a detailed view of separator switch 250A. The outputs from combined multiplier 174A, explicitly labelled $di^A$ 261A, $q^A$ 263A, and $i^A$ 265A, are fed into input port 260A, input port 262A, and input port 264A, respectively, of separator switch 250A. The corresponding output ports are output port 270A, output port 272A, and output port 274A, respectively. Separator switch 250A is operated in response to clock signal 161. When separator switch 250A is closed, the corresponding output signals, code multiplier output $di_A$ 271A, quadrature multiplier output $q_A$ 273A, and in-phase multiplier output $i_A$ 275A, respectively, are fed into accumulator 178A, accumulator 180A, and accumulator 190, respectively. The output signals from accumulator 178A, accumulator 180A, and accumulator 190 are code correlation signal $dI_A$ 281A, quadrature correlation signal $Q_A$ 283A, and in-phase correlation signal I 285AB, respectively. The output of accumulator 190 is labelled I 285AB because it accumulates signals from both antenna unit 104A and antenna unit B 104B.

Separator switch 250B is configured similar to that of separator switch 250A, and signals from antenna unit B 104B are tracked similar to the signals from antenna unit 104A. Digital processing in digital processing block 240 then proceeds as in digital processing block 140. In some instances, the switching configuration shown in FIG. 2A-FIG. 2C may be advantageous for hardware and ASIC development, relative to the switching configuration shown in FIG. 1A and FIG. 1B.

Figure 3A:
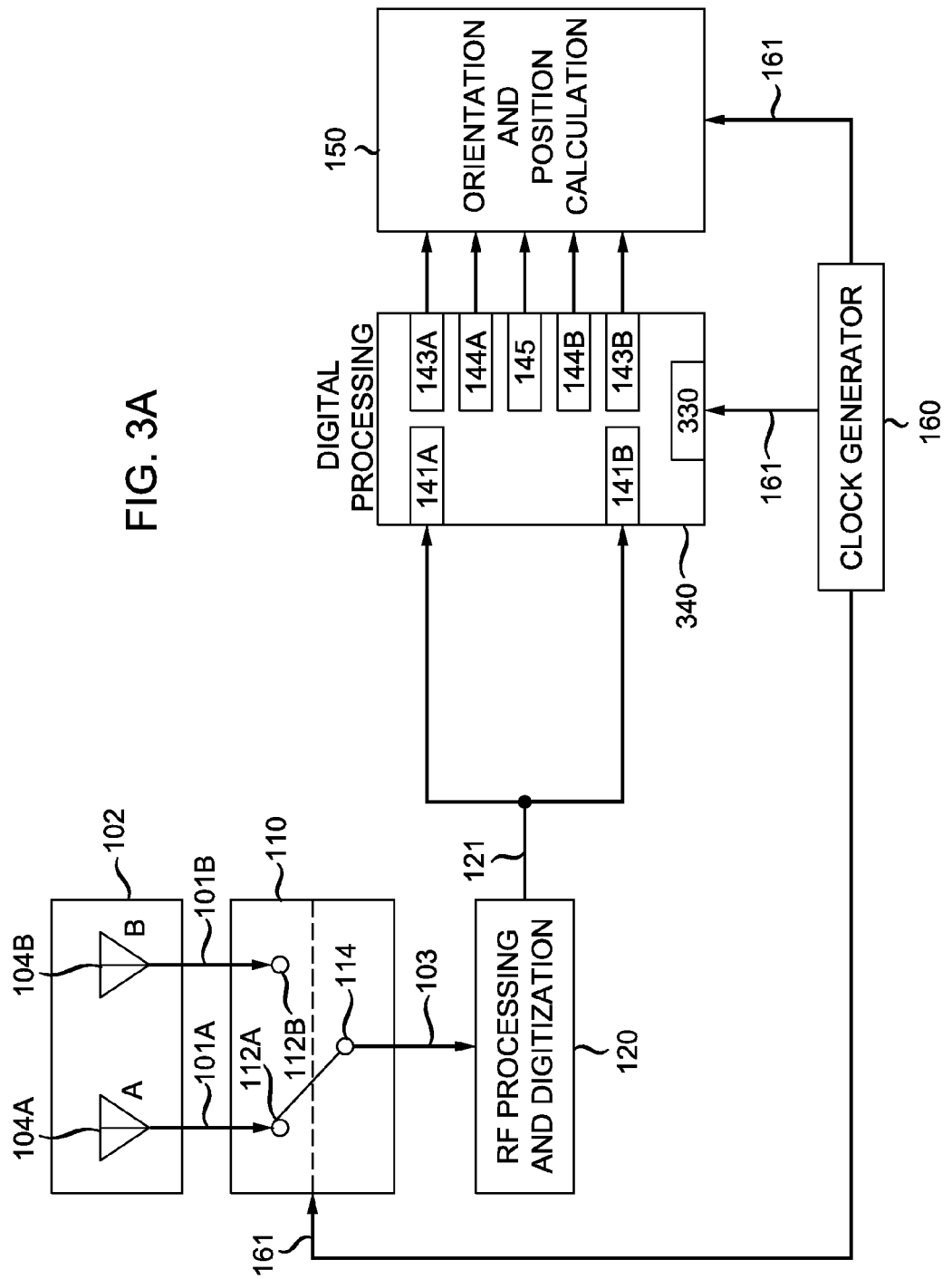
FIG. 3A and FIG. 3B show a schematic of a navigation receiver similar to that shown in FIG. 2A-FIG. 2C, except signals from individual antenna units are separated at the outputs of accumulators within closed phase-lock loops and delay-lock loops.
Figure 3B:
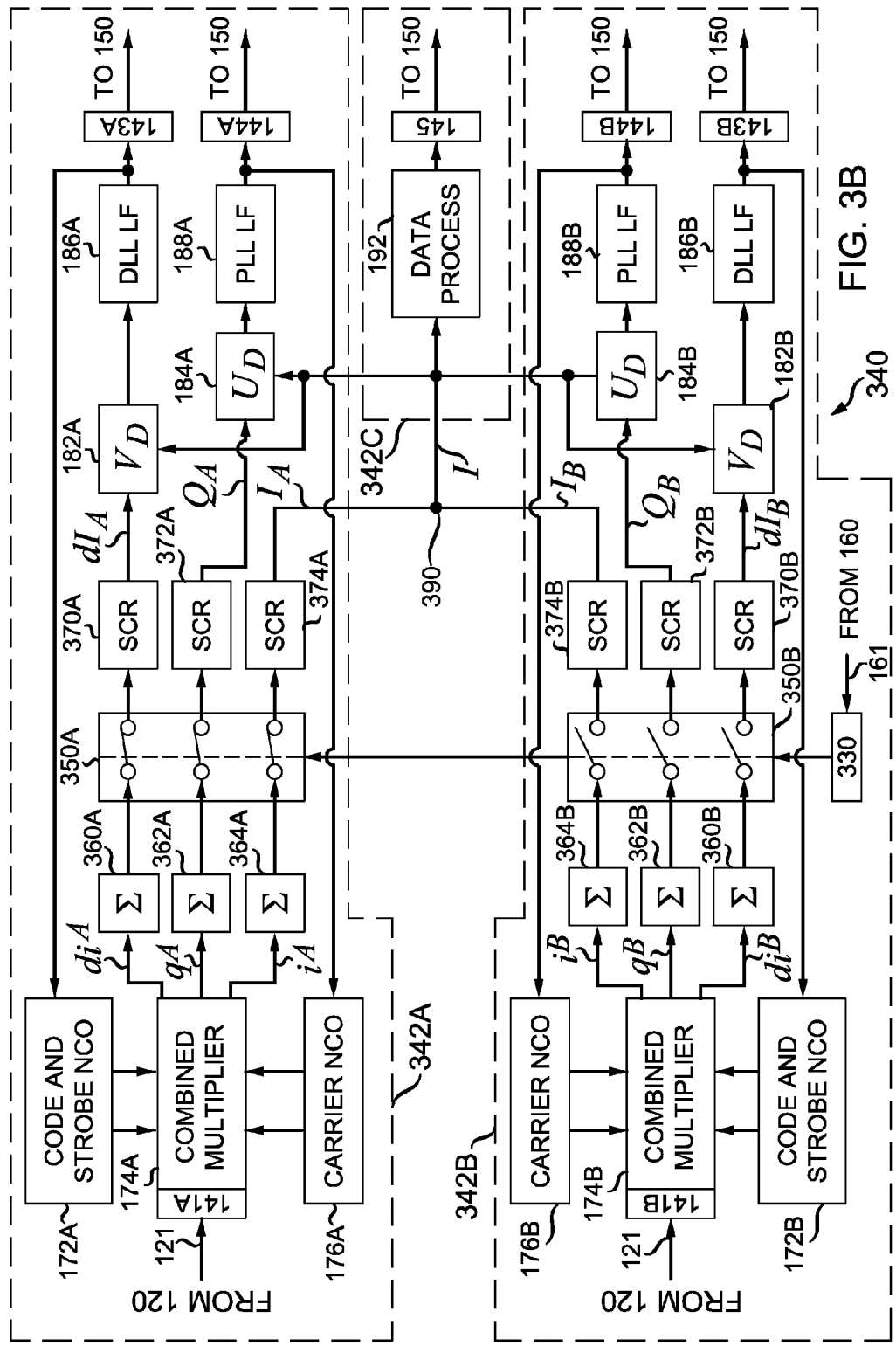

Another embodiment is shown in FIG. 3A and FIG. 3B. The overall system architecture, shown in FIG. 3A, is similar to that shown in FIG. 2A, except that the internal structure of digital processing block 340 is different from that of digital processing block 240. Details of digital processing block 340 are shown in FIG. 3B. Digital processing block 340 is partitioned into three digital processing sub-blocks. Digital processing sub-block 342A is dedicated to processing signals from antenna unit A 104A. Digital processing sub-block 342B is dedicated to processing signals from antenna unit B 104B. Digital processing sub-block 342C is a common sub-block that processes signals from both antenna unit A 104A and antenna unit B 104B.

Refer now to the digital processing within digital processing sub-block 342A. The outputs of combined multiplier 174A (code multiplier output $di^A$, quadrature multiplier output $q^A$, and in-phase multiplier output $i^A$) are inputted into accumulator 360A, accumulator 362A, and accumulator 364A, respectively. The outputs of the accumulators are fed into input ports of separator switch 350A.

The output ports of the accumulators are coupled to screening blocks (SCRs), details of which are discussed below. When separator switch 350A is closed, the output of accumulator 360A is fed into the input of screening block 370A, the output of accumulator 362A is fed into the input of screening block 372A, and the output of accumulator 364A is fed into the input of screening block 374A.

The mode of operation of separator switch 350A is similar to that of separator switch 250A in FIG. 2B and FIG. 2C. In response to clock signal 161, separator switch 350A connects/disconnects the PLL and DLL tracking systems in synchronization with antenna multiplexer switch 110 (FIG. 3A). After each switching cycle of antenna multiplexer 110, the first values of the correlation signals I, Q, and dI at the outputs of accumulator 364A, accumulator 362A, and accumulator 360A, respectively, will not be true, since the accumulators will include stored values from both antenna unit A 104A and antenna unit B 104B. These invalid values of the correlation signals I, Q, and dI are eliminated by screening block 374A, screening block 372A, and screening block 370A, respectively. Herein, the correlation signal at the output of an accumulator comprises correlation signal segments, each specific correlation signal segment corresponding to a specific antenna unit. For eliminating invalid correlation signals, screening block 374A, screening block 372A, and screening block 370A should have information concerning the times at which separator switch 350A is closed. Connections providing this information between clock generator 160 and screening block 374A, screening block 372A, and screening block 370A are not shown.

A screening block may be implemented by a switch that operates synchronously with antenna multiplexer switch 110. The switch disconnects the processing circuit when the first value of the correlation signal after the antenna multiplexer switch 110 has been switched reaches the screening block. The switch then closes for the remainder of the sequence. For example, if the screening block receives the input quadrature correlation signal sequence (k-values are received after each switching operation)

$\ldots, Q_1, Q_2, Q_3, \ldots, Q_k, Q_1, Q_2, Q_3, \ldots, Q_k, Q_1, Q_2, Q_3, \ldots Q_k, \ldots$;

then the output of the screening block is the sequence $\ldots, \_, Q_2, Q_3, \ldots Q_k, \_, Q_2, Q_3, \ldots Q_k, \_, Q_2, Q_3, \ldots Q_k, \ldots$.

The first value $Q_1$ of each sequence has been eliminated.

The processing of correlation signals to eliminate invalid measurements degrades the tracking characteristics in the embodiment shown in FIG. 3A and FIG. 3B relative to the embodiment shown in FIG. 2A-FIG. 2C. This degradation, however, can be minimized by optimizing the switching parameters for antenna multiplexer switch 110 and by optimizing the storage times of correlation signals in accumulator 364A, accumulator 362A, and accumulator 360A. The embodiment shown in FIG. 3A and FIG. 3B can be useful for receiver designs which use existing hardware (such as commercially available ASICs) to implement various elements of digital processing block 342A: for example, combined multiplier 174A, carrier NCO 176A, code and strobe NCO 172A, accumulator 364A, accumulator 362A, and accumulator 360A.

In the embodiment shown in FIG. 3B, note that the common in-phase correlation signal I is generated by two accumulators (accumulator 364A and accumulator 364B). The common in-phase correlation signal I is generated at summing junction 390 by summing $I_A$, the in-phase correlation signal corresponding to antenna unit 104A, and $I_B$, the in-phase correlation signal corresponding to antenna unit 104B. In this embodiment, the common in-phase correlator includes combined multiplier 174A, accumulator 364A, combined multiplier 174B, accumulator 364B, and summing junction 390.

As new GNSSs are developed and deployed, the number of satellites and received signals increases. In the embodiments described above, a receiver has a separate digital processing block to perform correlation processing for each corresponding satellite system. Consequently, an increase in the number of functional digital processing blocks results in an increase in the number of hardware modules. As the number N of antenna units increases, the number of hardware modules and the overall complexity of the hardware increase further. Embodiments described below utilize hardware more efficiently.

The overall architecture of the embodiment shown in FIG. 4A comprises a set of antenna units 102, an antenna multiplexer switch 110, a clock generator 160, a digital processing block 440, and an orientation and position calculation block 150. Digital processing block 440 is partitioned into digital processing sub-block 442 and digital processing sub-block 444. The output RF digital signal 121 from the RF processing and digitization block 120 is fed into input 441 of digital processing sub-block 442. The clock signal 161 from clock generator 160 is sent to antenna multiplexer switch 110 and orientation and position calculation block 150. The clock signal 161 is also fed into input 430 of digital processing sub-block 442. Output 401A, output 401B, output 403, output 404A, and output 404B of digital processing sub-block 442 are sent to input 411A, input 411B, input 413, input 414A, and input 414B of digital processing sub-block 444, respectively. Output 416A, output 416B, output 418A, and output 418B of digital processing sub-block 444 are sent to input 406A, input 406B, input 408A, and input 408B of digital processing sub-block 442, respectively. Output 421A, output 422, output 423A, output 421B, and output 423B of digital processing sub-block 444 are sent to orientation and position calculation block 150.

Figure 4B:
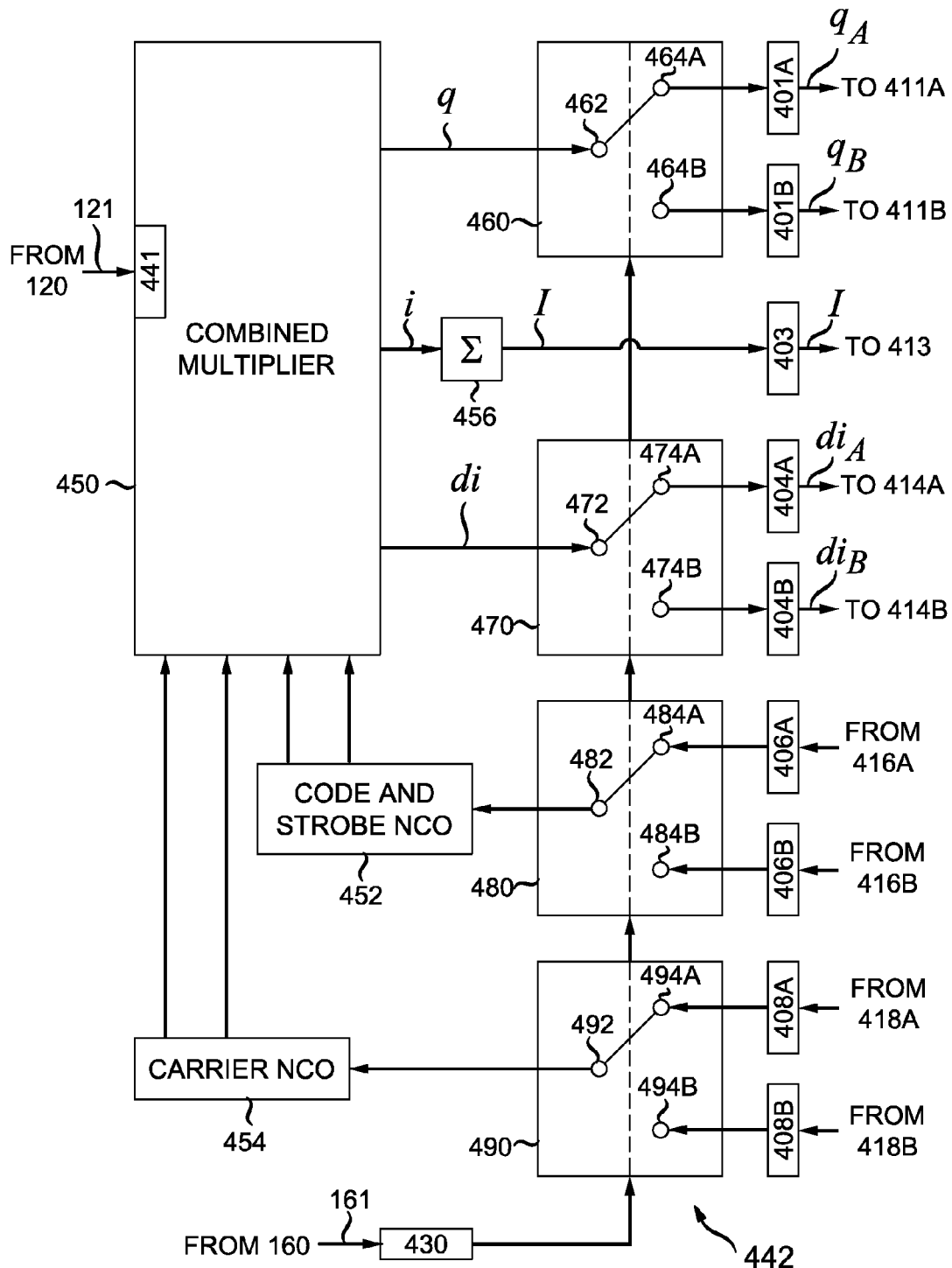
Figure 4C:
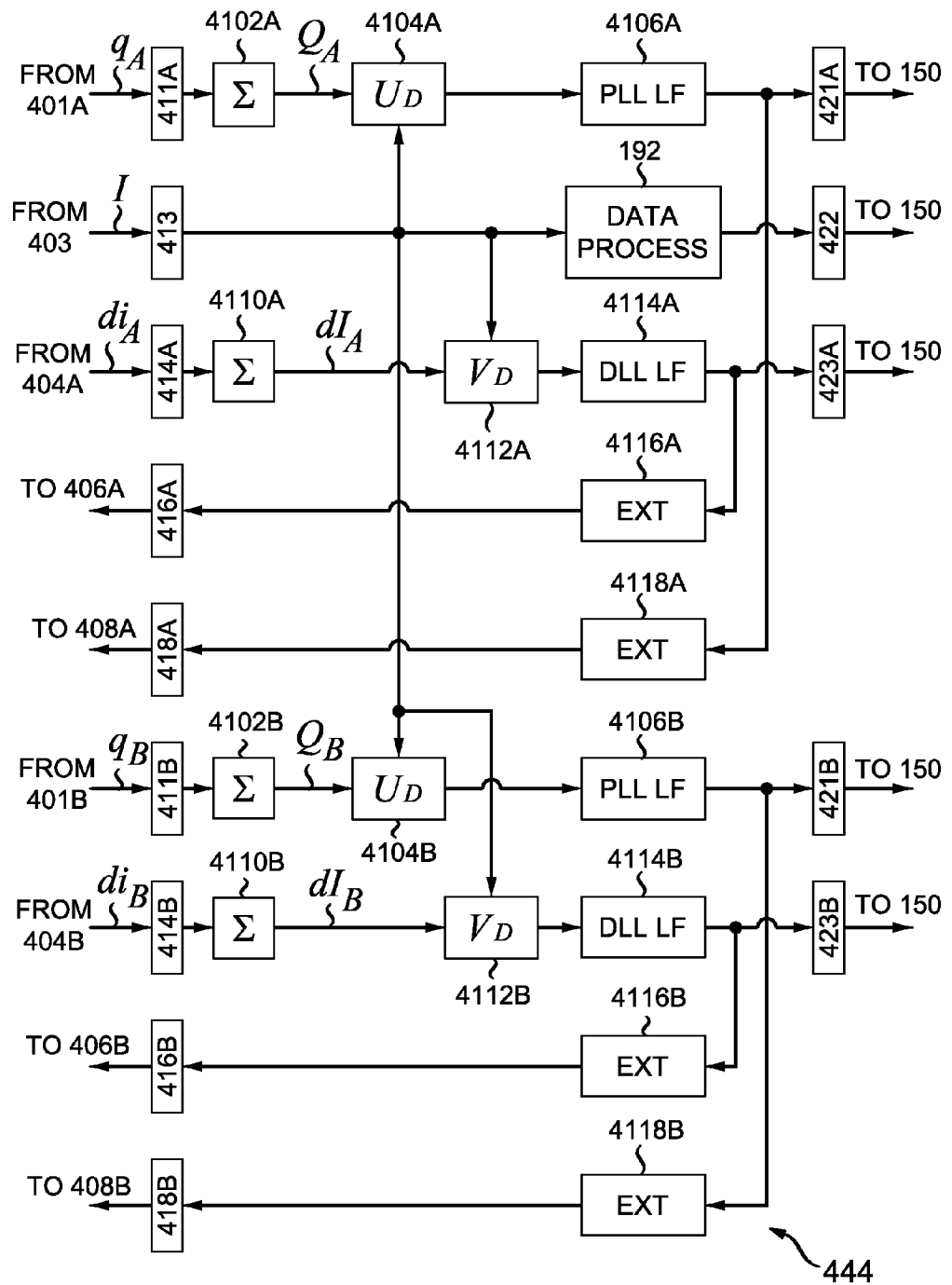

In the previous embodiments discussed above, signals from each individual antenna unit were processed by corresponding individual hardware modules. In contrast, in the embodiment shown in FIG. 4A-FIG. 4C, the number of hardware modules does not depend on the number of antenna units in the set of antenna units 102. Refer to FIG. 4B and FIG. 4C for details of digital processing block 440. The output RF digital signal 121 from RF processing and digitization block 120 is fed into input port 441 of a single (common) combined multiplier 450. Reference signals for all incoming antenna signals are generated by a single (common) carrier NCO 454 and a single (common) code and strobe NCO 452.

The outputs of the combined multiplier 450 are the in-phase multiplier output i, the quadrature multiplier output q, and the code multiplier output di. The quadrature multiplier output q is fed into input port 462 of separator switch 460. In response to clock signal 161, the output of separator switch 460 switches between output port 464A and output port 464B. Similarly, the code multiplier output di is fed into input port 472 of separator switch 470. In response to clock signal 161, the output of separator switch 470 switches between output port 474A and output port 474B. Antenna multiplexer switch 110, separator switch 460, and separator switch 470 operate synchronously.

When the signals from antenna unit A 104A are being processed, the output of separator switch 460 is switched to output port 464A. The corresponding quadrature multiplier output $q_A$ is inputted into accumulator 4102A. The output of accumulator 4102A (quadrature correlation signal $Q_A$) is processed successively by discriminator 4104A and PLL loop filter 4106A. The output of PLL loop filter 4106A is sent to orientation and position calculation block 150. Similarly, the output of separator switch 470 is switched to output port 474A. The corresponding code multiplier output $di_A$ is inputted into accumulator 4110A. The output of accumulator 4110A (code correlation signal $dI_A$) is processed successively by discriminator 4112A and DLL loop filter 4114A. The output of DLL loop filter 4114A is sent to orientation and position calculation block 150.

When the signals from antenna unit B 104B are being processed, the output of separator switch 460 is switched to output port 464B, and the corresponding quadrature multiplier output $q_B$ is inputted into accumulator 4102B. The output of accumulator 4102B (quadrature correlation signal $Q_B$) is processed successively by discriminator 4104B and PLL loop filter 4106B. The output of PLL loop filter 4106B is sent to orientation and position calculation block 150. Similarly, the output of separator switch 470 is switched to output port 474B, and the corresponding code multiplier output $di_B$ is inputted into accumulator 4110B. The output of accumulator 4110B (code correlation signal $dI_B$) is processed successively by discriminator 4112B and DLL loop filter 4114B. The output of DLL loop filter 4114B is sent to orientation and position calculation block 150.

The in-phase multiplier output i is not switched. It is inputted into accumulator 456. The output of accumulator 456 (common in-phase correlation signal I) is inputted into data processing block 192. The output of data processing block 192 is sent to orientation and position calculation block 150.

Input control signals are fed into code and strobe NCO 452 and carrier NCO 454 via commutator switch 480 and commutator switch 490, respectively. Antenna multiplexer switch 110, commutator switch 480, and commutator switch 490 operate synchronously.

An input control signal is fed into code and strobe NCO 452 from output port 482 of commutator switch 480. In response to clock signal 161, output port 482 can be switched between input port 484A and input port 484B. When signals from antenna unit A 104A are being processed, the input of commutator switch 480 is switched to input port 484A, and the input control signal is the output of DLL loop filter 4114A processed by extrapolator 4116A. When signals from antenna unit B 104B are being processed, the input of commutator switch 480 is switched to input port 484B, and the input control signal is the output of DLL loop filter 4114B processed by extrapolator 4116B. Details of extrapolators are discussed below.

Similarly, an input control signal is fed into carrier NCO 454 from output port 492 of commutator switch 490. In response to clock signal 161, output port 492 can be switched between input port 494A and input port 494B. When signals from antenna unit A 104A are being processed, the input of commutator switch 490 is switched to input port 494A, and the input control signal is the output of PLL loop filter 4106A processed by extrapolator 4118A. When signals from antenna unit B 104B are being processed, the input of commutator switch 490 is switched to input port 494B, and the input control signal is the output of PLL loop filter 4106B processed by extrapolator 4118B.

Figure 8:
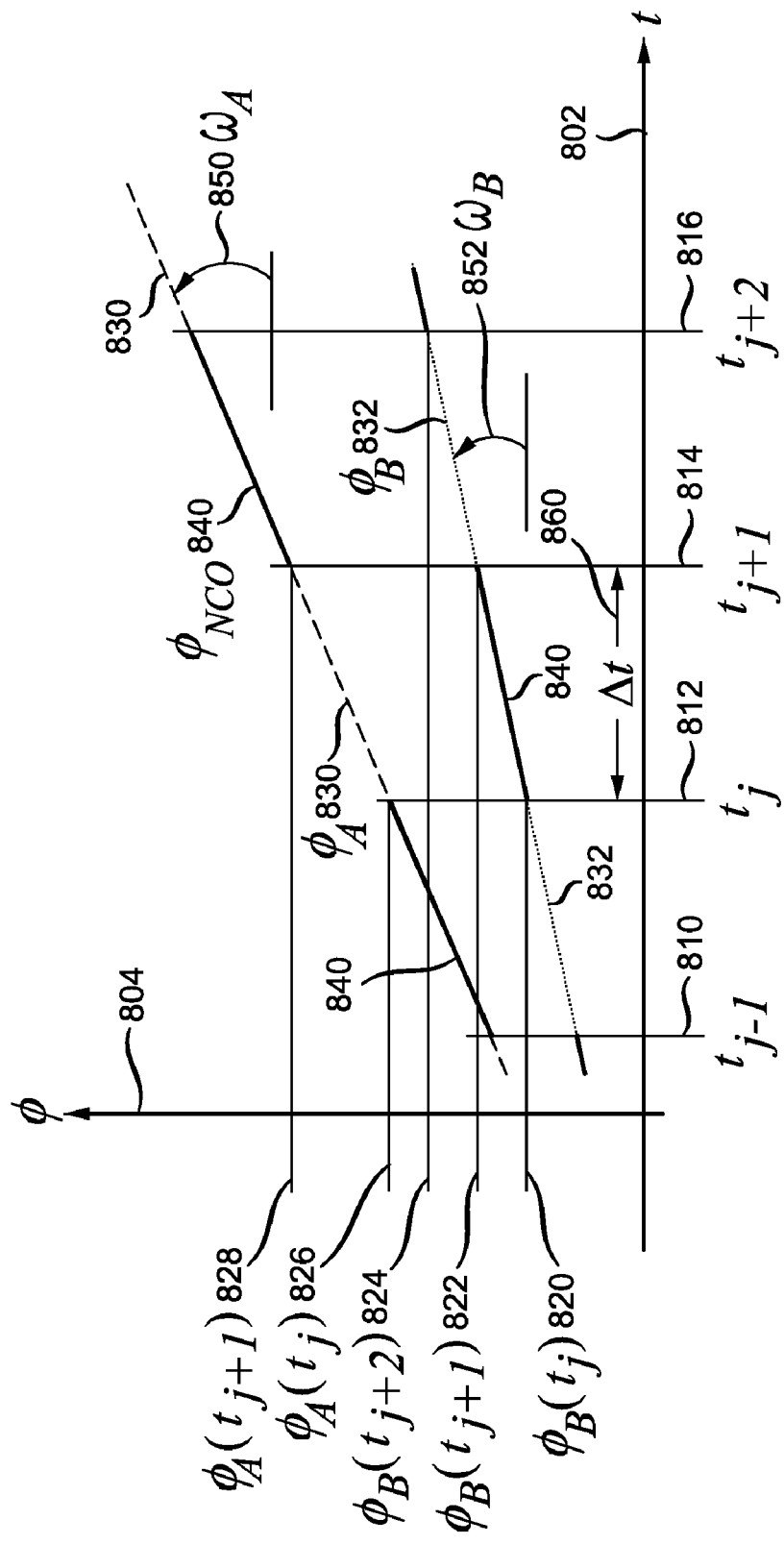
FIG. 8 shows plots of the phase of the carrier numerically controlled oscillator as a function of switching time.

The function of an extrapolator is discussed with reference to the plots in FIG. 8. The example shows extrapolation of the input control signal to the carrier NCO 454. The horizontal (t) axis 802 represents the time t; the vertical ($\phi$) axis 804 represents the phase $\phi$. Along the t-axis are shown a sequence of equally spaced reference times ($t_{j-1}$ 810, $t_j$ 812, $t_{j+1}$ 814, $t_{j+2}$ 816). The interval between neighboring reference times is $\Delta t$ 860. Plot 830 (dashed line segments) represents the phase $\phi_A$ of the signals from antenna A 104A. Plot 832 (dotted line segments) represents the phase $\phi_B$ of the signals from antenna B 104B. Plot 840 (solid line segments) represents the phase $\phi_{NCO1}$. To simplify the notation, $\phi_{NCO1}$ refers to the phase of the carrier NCO 454. The slope of $\phi_A$ as a function of t is the frequency $\omega_A$ 850, and the slope of $\phi_B$ as a function of t is the frequency $\omega_B$ 852. Shown are representative values of phases at specific reference times: $\phi_A(t_{j+1})$ 828, $\phi_A(t_j)$ 826, $\phi_B(t_{j+2})$ 824, $\phi_B(t_{j+1})$ 822, and $\phi_B(t_j)$ 820.

The antenna multiplexer switch 110 is switched at the reference times ($t_{j-1}$, $t_j$, $t_{j+1}$, $t_{j+2}$). In the following discussion, these reference times are also referred to as switching times. During the interval from $t_{j-1}$ to $t_j$, signals from antenna A 104A are processed, and $\phi_{NCO1}$ should match $\phi_A$. During the interval from $t_j$ to $t_{j+1}$, signals from antenna B 104B are processed, and $\phi_{NCO1}$ should match $\phi_B$. During the interval from $t_{j+1}$ to $t_{j+2}$, signals from antenna A 104A are processed, and $\phi_{NCO1}$ should match $\phi_A$.

At each switching time, carrier NCO 454 needs to generate a reference oscillation with the correct phase and frequency for the new received signals. Extrapolation is used to calculate the correct values for the next interval after switching. If the acceleration of an antenna unit in motion is negligible, the frequency $\omega$ may be assumed to be constant over an interval $\Delta t$, and linear extrapolation may be used. As an example, consider the case in which antenna multiplexer switch 110 is switched from antenna B 104B to antenna A 104A at switching time $t_{j+1}$. At the moment of switching, $\phi_{NCO}(t_{j+1})$ is set to $\phi_B(t_{j+1})$. Just after switching, $\phi_{NCO}(t_{j+1})$ needs to be set to $\phi_A(t_{j+1})$ (assuming that the switching time is negligible). Just after switching at switching time $t_j$, the value of $\phi_{NCO1}$ was previously set to $\phi_A$: $\phi_{NCO1}(t_j) = \phi_A(t_j)$. Therefore, the value of $\phi_{NCO1}(t_{j+1})$ (just after switching) may be calculated by the following extrapolation algorithm:

$$\phi_{NCO}(t_{j+1}) = \phi_{NCO}(t_j) + \Delta t \cdot \omega_{NCO};$$

$$\omega_{NCO} = \omega_A;$$

$$\phi_{NCO}(t_j) = \phi_A(t_j).$$

The extrapolated value is recorded in carrier NCO 454. A similar extrapolation is performed when the antenna multiplexer switch 110 is switched from antenna unit A 104A to antenna unit B 104B (for example, at switching time $t_{j+2}$). Extrapolated values of carrier frequency and phase for the current time are sent to carrier NCO 454 as input control signals. If the frequency $\omega$ is not constant over the interval $\Delta t$, square extrapolation (using a quadratic function) may be used.

The extrapolator for the code and strobe NCO 452 operates in a similar manner:

$$\tau_{NCO2}(t_{j+1}) = \tau_{NCO2}(t_j);$$

$$\tau'_{NCO2} = 0;$$

$$\tau_{NCO2}(t_j) = \tau_A(t_j).$$

Here, τ is the code delay, and τ' is the derivative of τ with respect to t. To simplify the notation, $\tau_{NCO2}$ refers to the code delay of the code and strobe NCO 454, and $\tau_A$ refers to the code delay of signals from antenna unit A 104A. Note that in most practical cases, the rate of code delay change over the interval Δt is negligible and may be set to zero. If the distance between antenna units is much shorter than pseudo-range measurement errors, then the code and strobe NCO extrapolator does not need to be used, since delay changes can be neglected when the antenna units are switched. In general, extrapolated values of code delay for the current time are sent to code and strobe NCO 452 as input control signals.

Extrapolated carrier phase and frequency are calculated for the instant of disconnecting the PLL and recorded in the carrier NCO 454 at the instant of connecting the PLL. Carrier NCO 454 should provide independent control both in phase and frequency. In an embodiment, PLL loop filter 4106A and PLL loop filter 4106B are implemented by second order filters. Clock generator 160 determines the instants of disconnecting and connecting the PLL and determines the pause duration necessary for operating extrapolator 4116A, extrapolator 4116B, extrapolator 4118A, and extrapolator 4118B. Connections between clock generator 160 and the extrapolators are not shown in the figures.

In the embodiment shown in FIG. 4A-FIG. 4C, the combined multiplier 450, carrier NCO 454, and code and strobe NCO 452 are normally implemented in hardware. Since they process all signals received from the set of antenna units 102, the number of hardware modules is independent of the number N of antenna units. Hardware utilization is therefore increased.

Figure 5A:
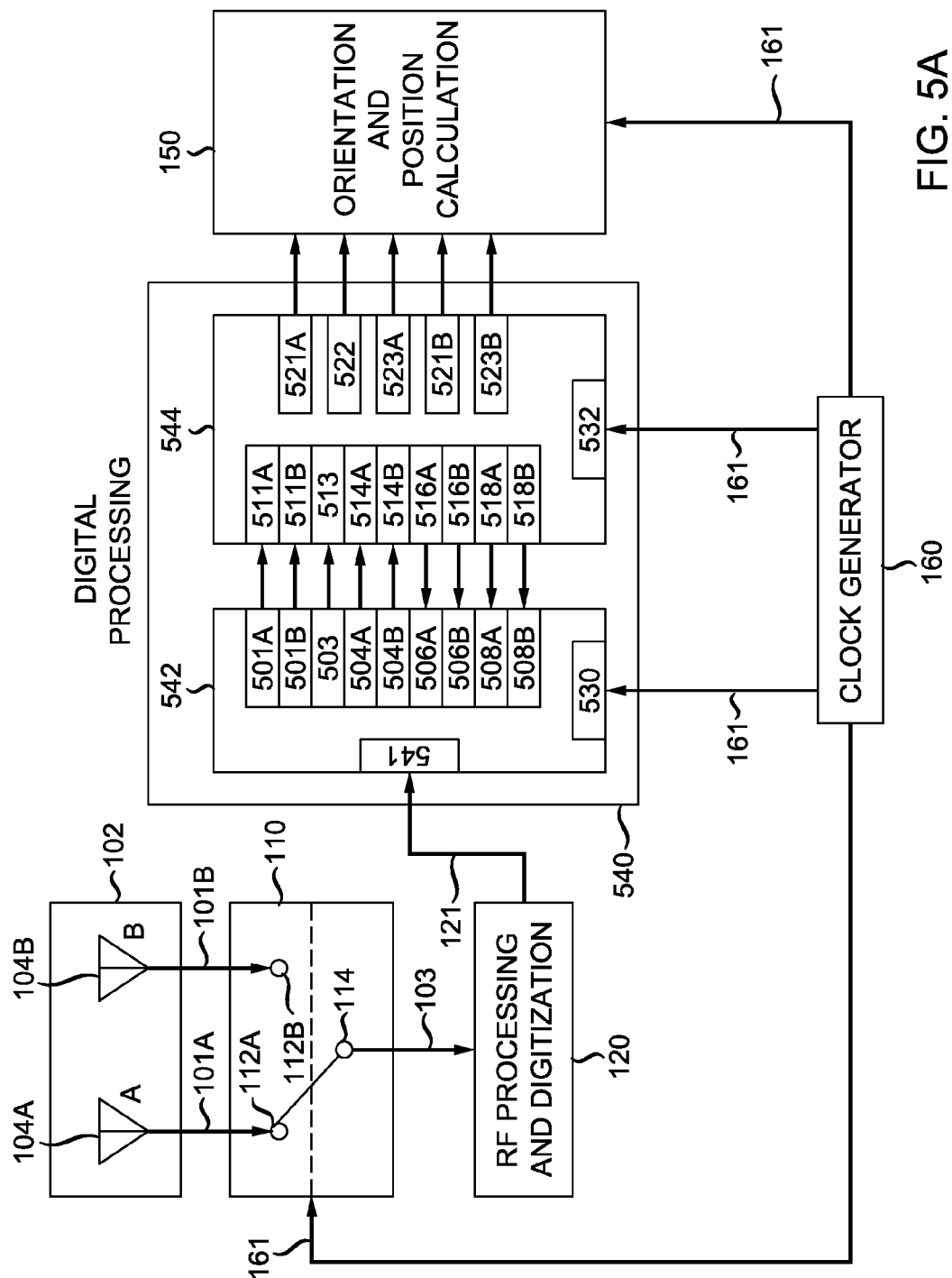
FIG. 5A-FIG. 5C show a schematic of a navigation receiver similar to that shown in FIG. 4A-FIG. 4C, except signals from individual antenna units are separated at the outputs of accumulators within closed phase-lock loops and delay-lock loops.
Figure 5B:
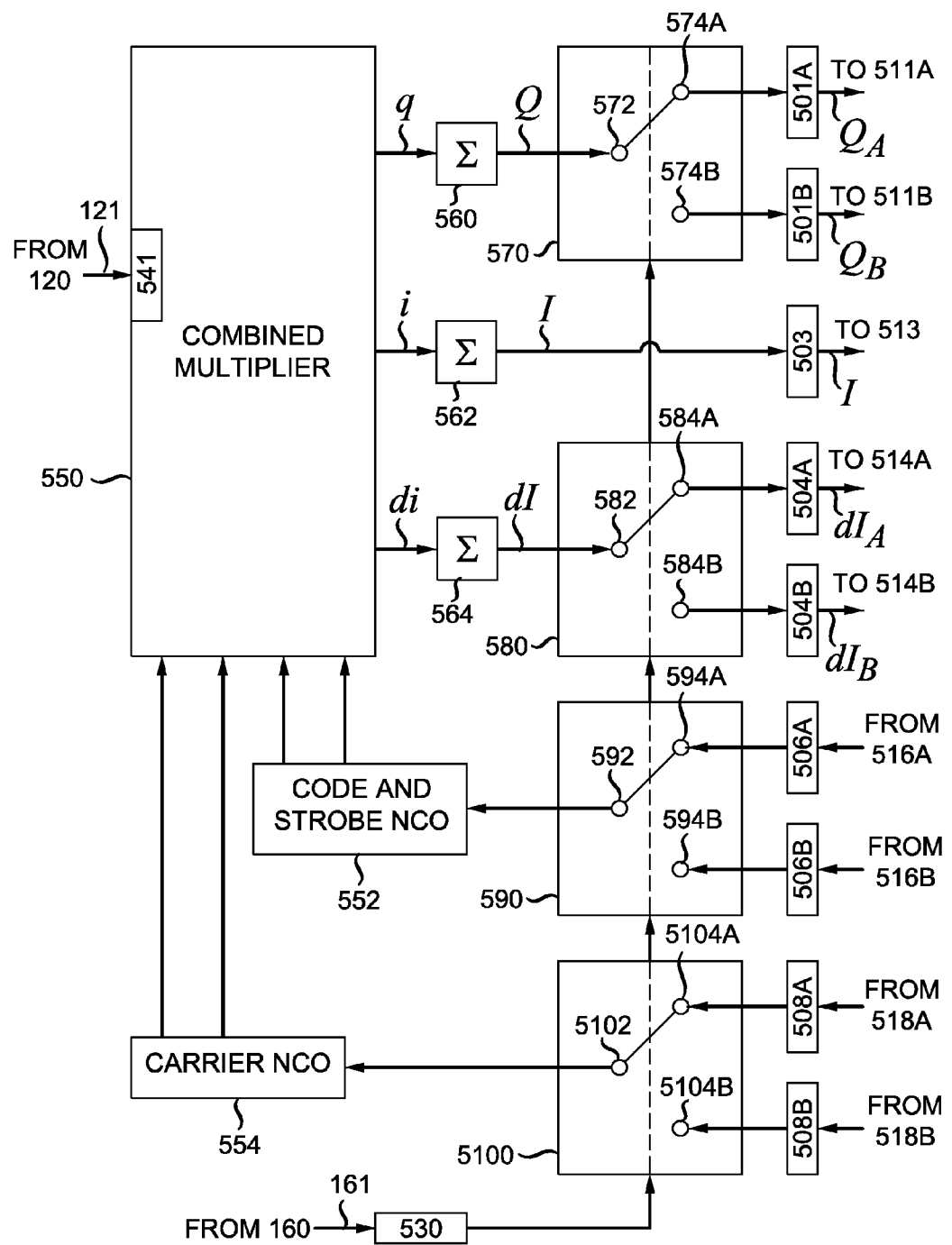
Figure 5C:
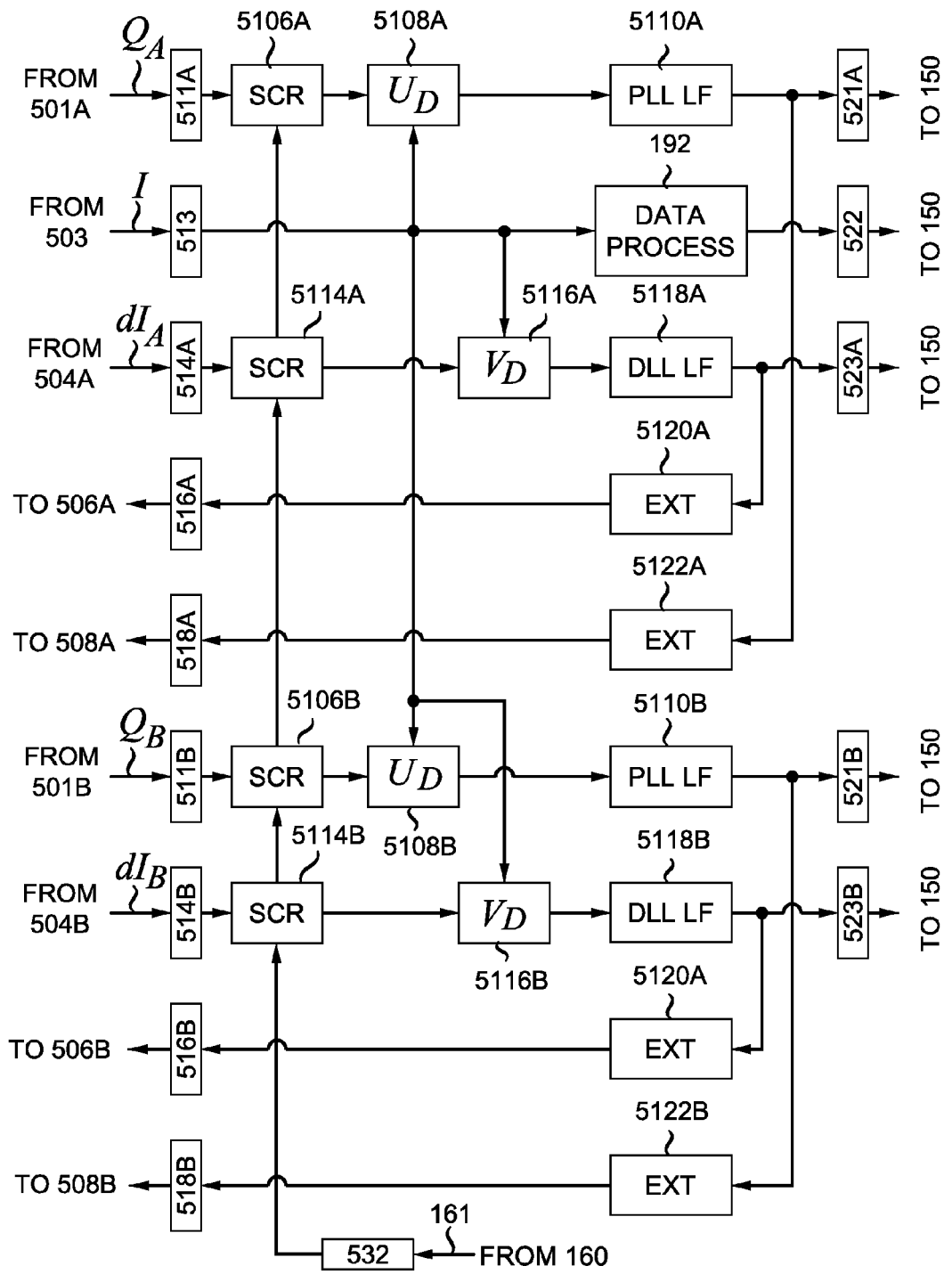

FIG. 5A-FIG. 5C show another embodiment. The overall architecture, shown in FIG. 5A, is similar to that shown in FIG. 4A, except the internal structure of digital processing block 540 is different from that of digital processing block 440. Digital processing block 540 is partitioned into digital processing sub-block 542 and digital processing sub-block 544. The output RF digital signal 121 from the RF processing and digitization block 120 is fed into input 541 of digital processing sub-block 542. The clock signal 161 from clock generator 160 is fed into input 530 of digital processing sub-block 442 and into input 532 of digital processing sub-block 544. Output 501A, output 501B, output 503, output 504A, and output 504B of digital processing sub-block 542 are sent to input 511A, input 511B, input 513, input 514A, and input 514B of digital processing sub-block 544, respectively. Output 516A, output 516B, output 518A, and output 518B of digital processing sub-block 544 are sent to input 506A, input 506B, input 508A, and input 508B of digital processing sub-block 542, respectively. Output 521A, output 522, output 523A, output 521B, and output 523B of digital processing sub-block 544 are sent to orientation and position calculation block 150.

Refer to FIG. 5B and FIG. 5C for details of digital processing block 540. The outputs of the combined multiplier 550 are the in-phase multiplier output i, the quadrature multiplier output q, and the code multiplier output di. These multiplier outputs are fed into accumulator 562, accumulator 560, and accumulator 564, respectively. The output of accumulator 560 (quadrature correlation signal Q) is fed into input port 572 of separator switch 570. In response to clock signal 161, the output of separator switch 570 switches between output port 574A and output port 574B. Similarly, the output of accumulator 564 (code correlation signal dI) is fed into input port 582 of separator switch 580. In response to clock signal 161, the output of separator switch 580 switches between output port 584A and output port 584B. Antenna multiplexer switch 110, separator switch 570, and separator switch 580 operate synchronously.

When the signals from antenna unit A 104A are being processed, the output of separator switch 570 is switched to output port 574A, and the quadrature correlation signal $Q_A$ is processed successively by screening block 5106A, discriminator 5108A, and PLL loop filter 5110A. The output of PLL loop filter 5110A is sent to orientation and position calculation block 150. Similarly, the output of separator switch 580 is switched to output port 584A, and the code correlation signal $dI_A$ is processed successively by screening block 5114A, discriminator 5116A, and DLL loop filter 5118A. The output of DLL loop filter 5118A is sent to orientation and position calculation block 150. The screening blocks eliminate invalid measurements, as described above with respect to FIG. 3B.

When the signals from antenna unit B 104B are being processed, the output of separator switch 570 is switched to output port 574B, and the quadrature correlation signal $Q_B$ is processed successively by screening block 5106B, discriminator 5108B, and PLL loop filter 5110B. The output of PLL loop filter 5110B is sent to orientation and position calculation block 150. Similarly, the output of separator switch 580 is switched to output port 584B, and the code correlation signal $dI_B$ is processed by screening block 5114B, discriminator 5116B, and DLL loop filter 5118B. The output of DLL loop filter 5118B is sent to orientation and position calculation block 150.

The common in-phase correlation signal I is not switched. The output of accumulator 562 is processed by data processing block 192. The output of data processing block 192 is sent to orientation and position calculation block 150.

Extrapolator 5120A, extrapolator 5122A, extrapolator 5120B, extrapolator 5122B, commutator switch 590, and commutator switch 5100 provide input control signals to carrier NCO 554 and code and strobe NCO 552, as described above in FIG. 4B and FIG. 4C in reference to extrapolator 4116A, extrapolator 4118A, extrapolator 4116B, extrapolator 4118B, commutator switch 480, commutator switch 490, carrier NCO 452, and code and strobe NCO 454, respectively.

In the embodiment shown in FIG. 5A-FIG. 5C, the combined multiplier 550, carrier NCO 554, code and strobe NCO 552, accumulator 560, accumulator 562, and accumulator 564 are typically implemented in hardware. Since they process all signals received from the set of antenna units 102, the number of hardware modules is independent of the number N of antenna units. Hardware utilization is therefore further increased, relative to the embodiment shown in FIG. 4A-FIG. 4C.

In the five embodiments discussed above, some common elements are used in the tracking systems for all antenna units in the set of antenna units 102; however, the receiver generates phase and delay measurements separately for each antenna unit. The orientation and position calculation block 150 uses these measurements to calculate the spatial position of each antenna unit in the set of antenna units 102 and the orientation of the set of antenna units 102. In these embodiments, the individual DLL of each antenna unit does not utilize the signal energy received by the entire set of antenna units 102.

In some applications, there is no need to determine the individual position of each antenna unit; it is necessary to determine only the position of the center of the set of antenna units. Herein, the center of the set of antenna units is referred to as the set center. The receiver design may then be simplified. Two suitable embodiments are described below.

In these embodiments, the orientation and position calculation block 150 determines the position of the set center according to code delays measured by the common DLL. Phase measurements, which are determined individually for each antenna unit, are used to calculate the relative spatial positions of one antenna unit relative to another antenna unit. From these relative spatial positions, the orientation of the set of antenna units can be determined.

Figure 6A:
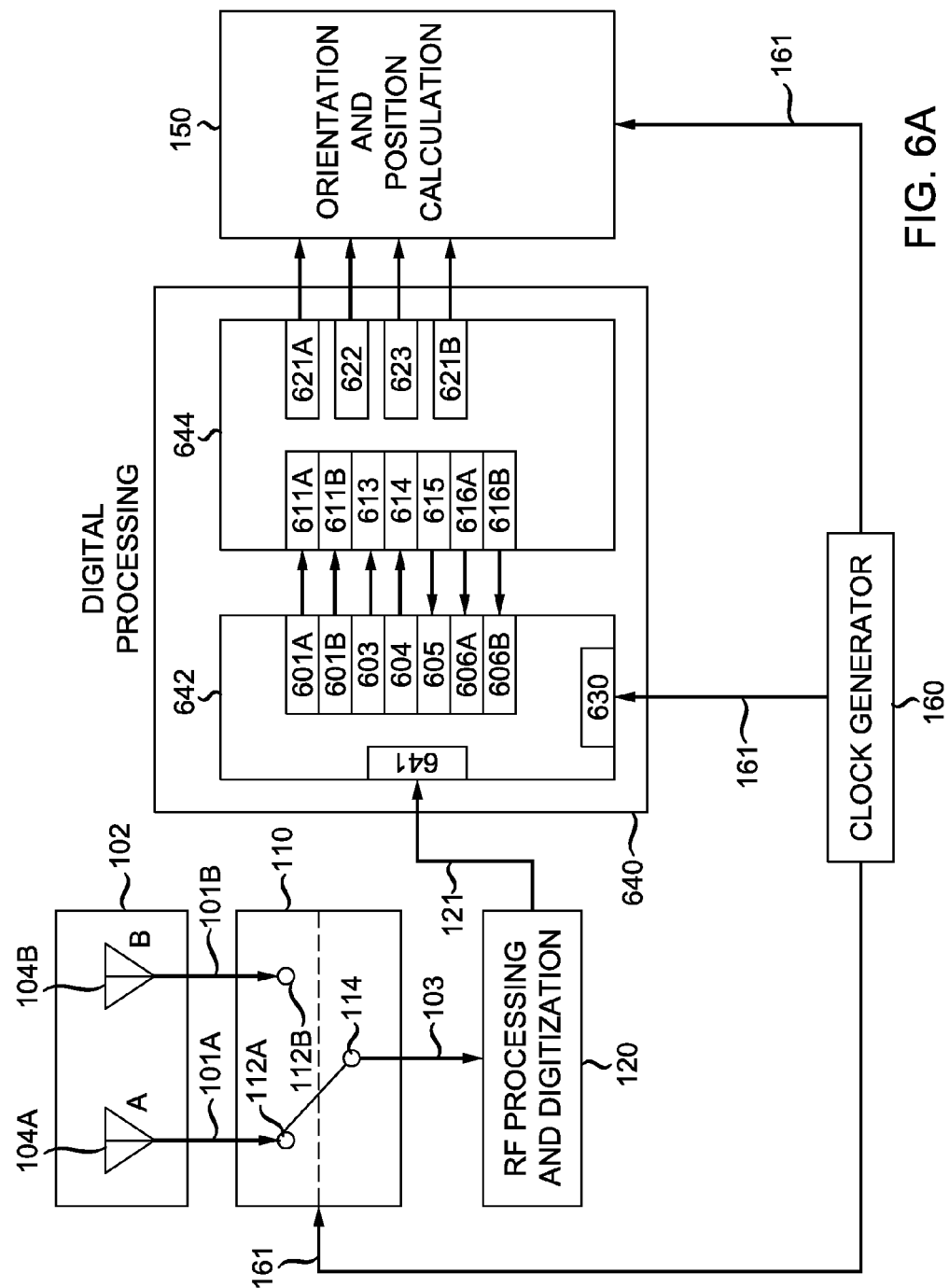
FIG. 6A-FIG. 6C show a schematic of a navigation receiver in which signals from individual antenna units are processed with a common delay-lock loop, and signals from individual antenna units are separated at the outputs of a common combined multiplier within closed phase-lock loops.
Figure 6B:
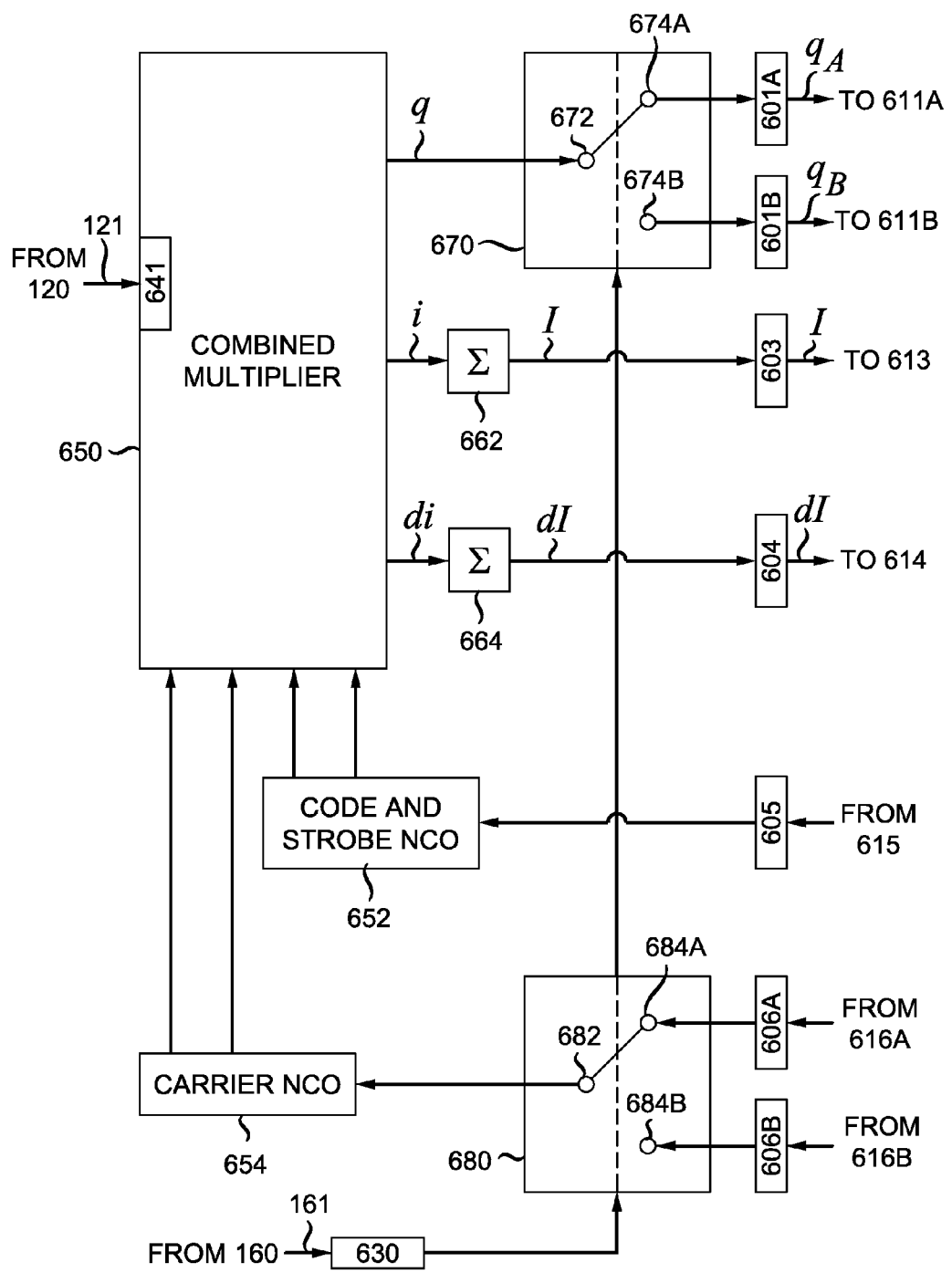
Figure 6C:
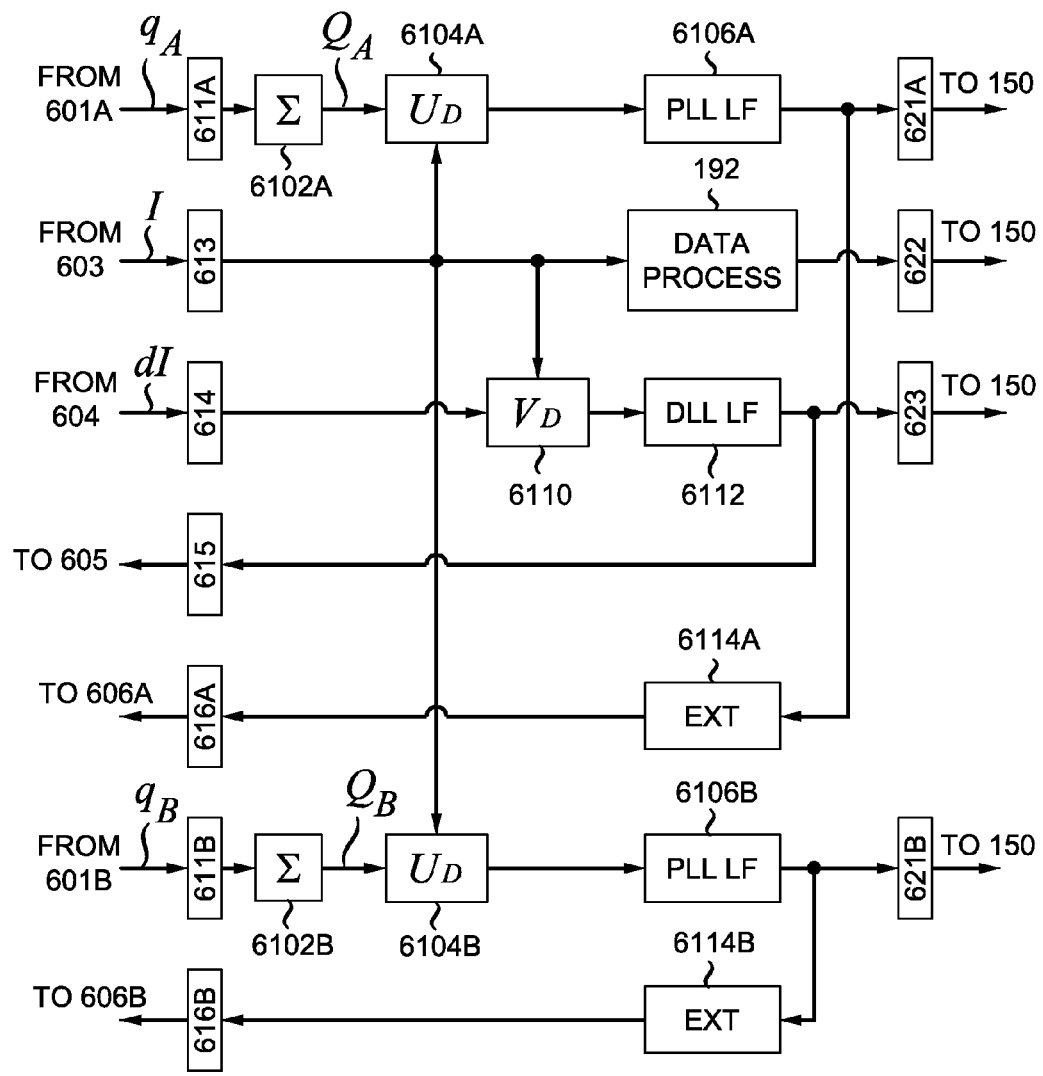

FIG. 6A-FIG. 6C show an embodiment in which the entire signal energy received by the set of antenna units is used in the DLL for measuring code delay, irrespective of the antenna unit selected by the antenna multiplexer switch. The overall architecture, shown in FIG. 6A, is similar to that shown in FIG. 4A, except the internal structure of digital processing block 640 is different from that of digital processing block 440. Digital processing block 640 is partitioned into digital processing sub-block 642 and digital processing sub-block 644. The output RF digital signal 121 from the RF processing and digitization block 120 is fed into input 641 of digital processing sub-block 642. The clock signal 161 from clock generator 160 is fed into input 630 of digital processing sub-block 642. Output 601A, output 601B, output 603, and output 604 of digital processing sub-block 642 are sent to input 611A, input 611B, input 613, and input 614 of digital processing sub-block 644, respectively. Output 615, output 616A, and output 616B of digital processing sub-block 644 are sent to input 605, input 606A, and input 606B of digital processing sub-block 642, respectively. Output 621A, output 622, output 623, and output 621B of digital processing sub-block 644 are sent to orientation and position calculation block 150.

Refer to FIG. 6B and FIG. 6C for details of digital processing block 640. The outputs of the combined multiplier 650 are the in-phase multiplier output i, the quadrature multiplier output q, and the code multiplier output di. The in-phase code multiplier output i, which is not switched, is fed into accumulator 662. The code multiplier output di, which is also not switched, is fed into accumulator 664.

The quadrature multiplier output q is fed into input port 672 of separator switch 670. In response to clock signal 161, the output of separator switch 670 switches between output port 674A and output port 674B. Antenna multiplexer switch 110, separator switch 670, and commutator switch 680 (see below) operate synchronously.

When the signals from antenna unit A 104A are being processed, the output of switch 670 is switched to output port 674A, and the corresponding quadrature multiplier output $q_A$ is inputted into accumulator 6102A. The output of accumulator 6102A (quadrature correlation signal $Q_A$) is processed successively by discriminator 6104A and PLL loop filter 6106A. The output of PLL loop filter 6106A is sent to orientation and position calculation block 150. Similarly, when the signals from antenna unit B 104B are being processed, the output of switch 670 is switched to output port 674B, and the corresponding quadrature multiplier output $q_B$ is inputted into accumulator 6102B. The output of accumulator 6102B (quadrature correlation signal $Q_B$) is processed successively by discriminator 6104B and PLL loop filter 6106B. The output of PLL loop filter 6106B is sent to orientation and position calculation block 150.

As discussed above, the in-phase multiplier output i is not switched. In-phase multiplier outputs from both antenna unit A 104A and antenna unit B 104B are accumulated in common accumulator 662. The output of accumulator 662 (common in-phase correlation signal I) is processed by data processing block 192; the output of data processing block 192 is sent to orientation and position calculation block 150.

As discussed above, the code multiplier output di is also not switched. Code multiplier outputs from both antenna unit A 104A and antenna unit B 104B are accumulated in common accumulator 664. The output of accumulator 664 (common code correlation signal dI) is processed successively by discriminator 6110 and DLL loop filter 6112. The output of DLL loop filter 6112 is sent to orientation and position calculation block 150.

For the code and strobe NCO 652, the output of DLL loop filter 6112 is used for the input control signal. For the carrier NCO 654, the input control signal is the output of extrapolator 6114A when processing signals from antenna unit 104A and the output of extrapolator 6114B when processing signals from antenna unit 104B. The output of extrapolator 6114A is fed into input port 684A of commutator switch 680, and the output of extrapolator 6114B is fed into input port 684B. In response to clock signal 161, the output port 682 (which feeds carrier NCO 654) switches between the input port 684A and the input port 684B.

Figure 7A:
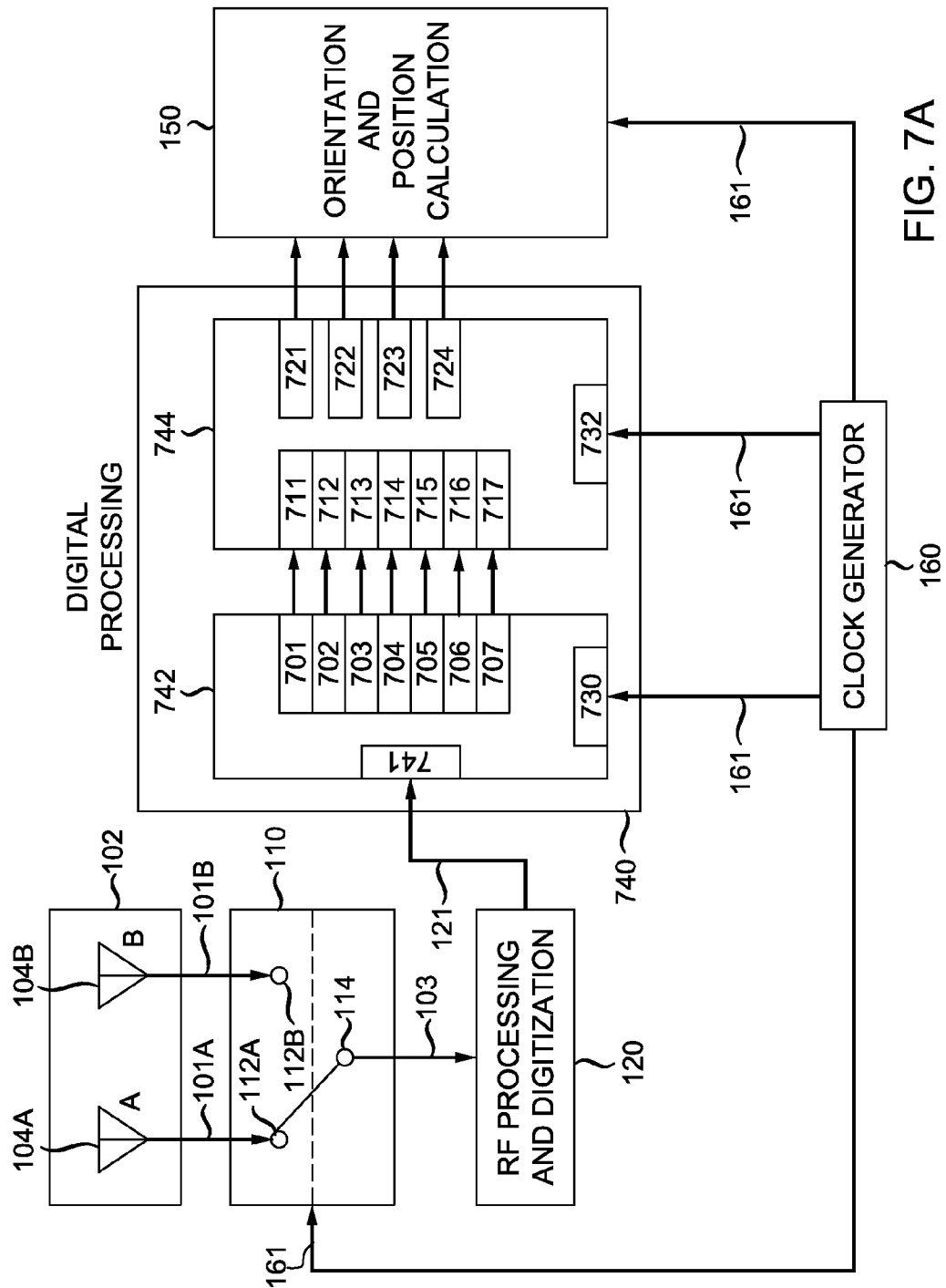
FIG. 7A-FIG. 7C show a schematic of a navigation receiver similar to that shown in FIG. 6A-FIG. 6C, except only the quadrature correlation signals from individual antenna units are separated at the outputs of an accumulator within closed phase-lock loops.
Figure 7B:
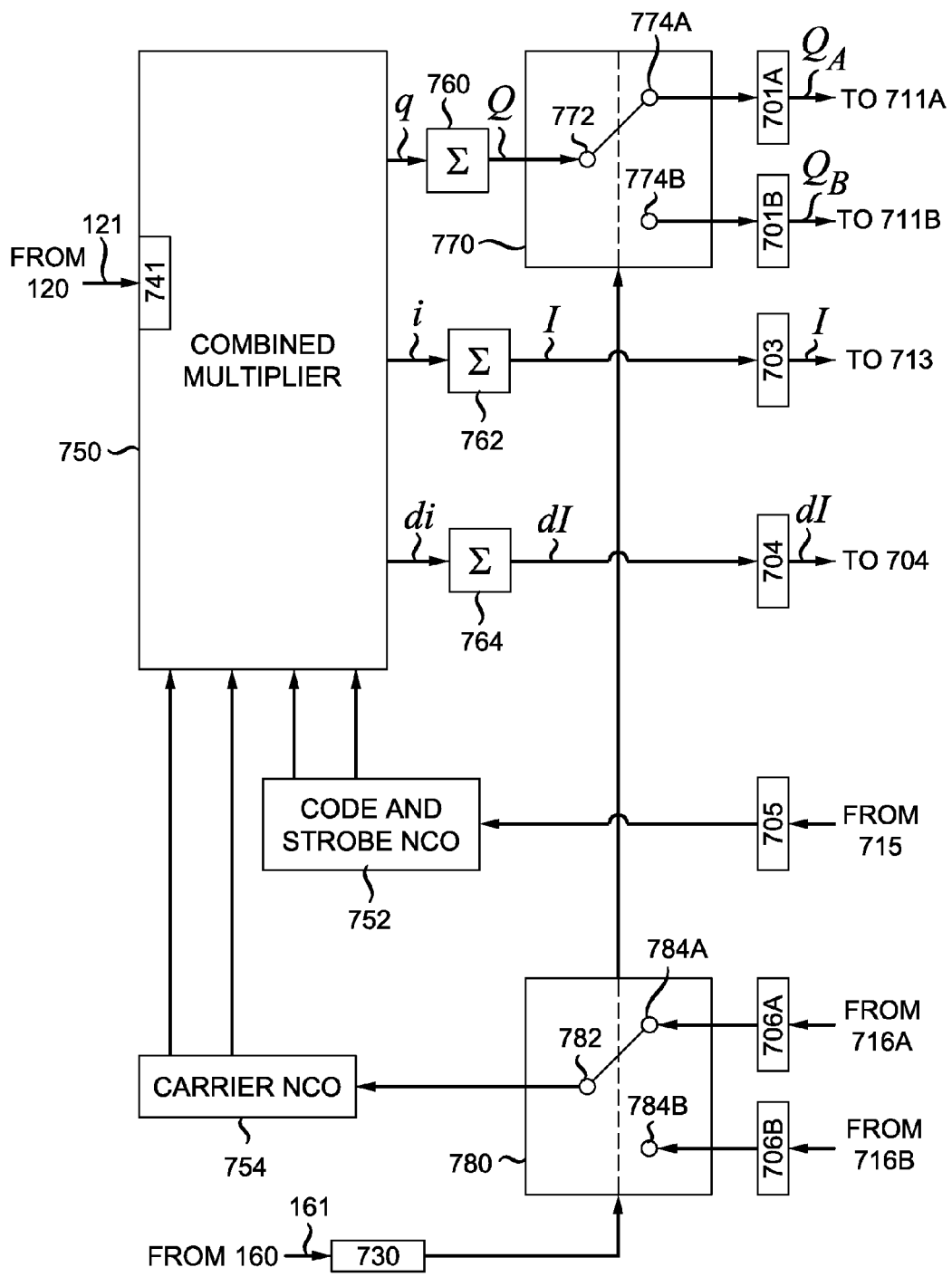
Figure 7C:
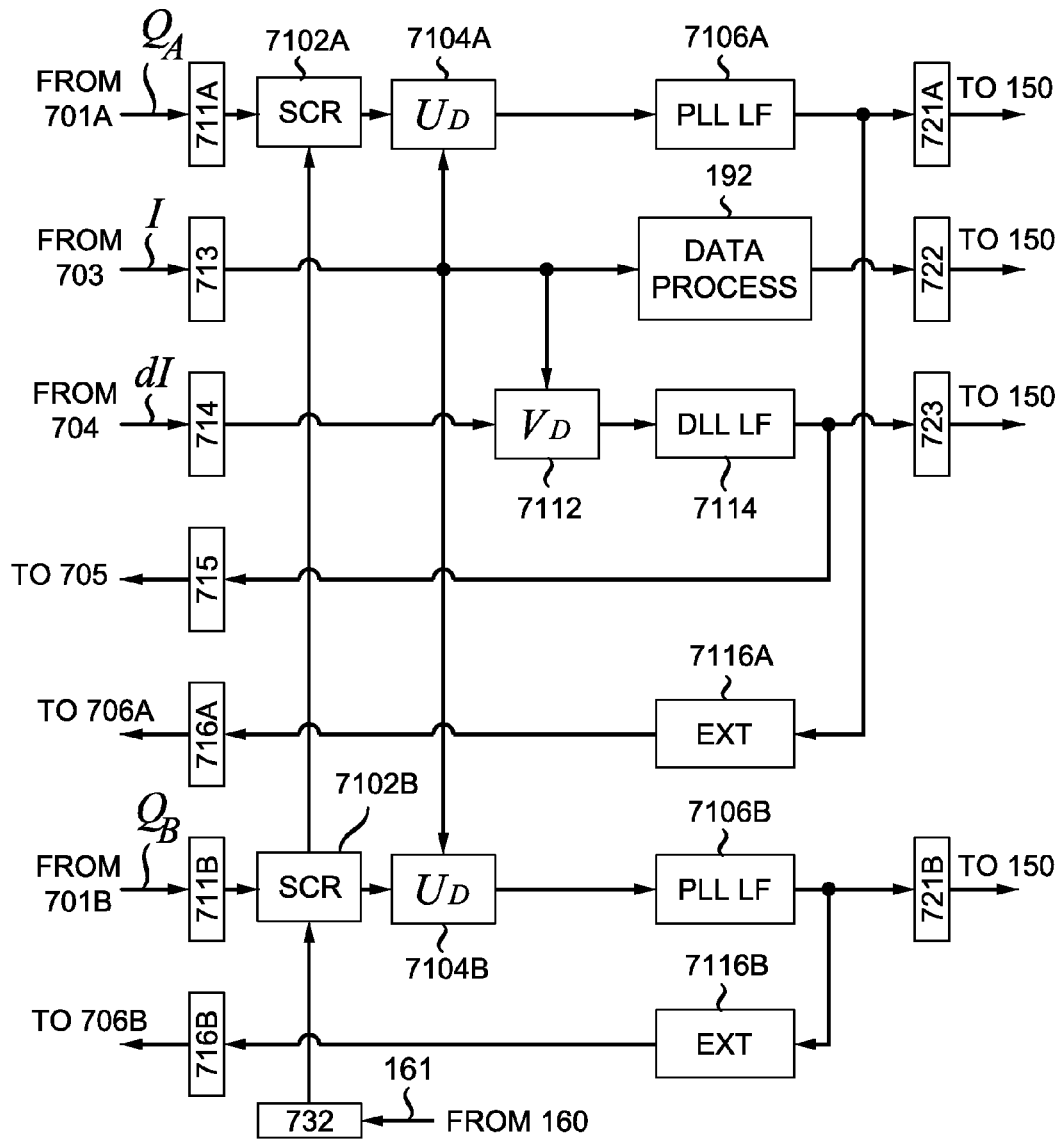

Another embodiment is shown in FIG. 7A-FIG. 7C. The overall architecture, shown in FIG. 7A, is similar to that shown in FIG. 5A, except the internal structure of digital processing block 740 is different from that of digital processing block 540. Digital processing block 740 is partitioned into digital processing sub-block 742 and digital processing sub-block 744. The output RF digital signal 121 from the RF processing and digitization block 120 is fed into input 741 of digital processing sub-block 742. The clock signal 161 from clock generator 160 is fed into input 730 of digital processing sub-block 742 and into input 732 of digital processing sub-block 744. Output 701A, output 701B, output 703, and output 704 of digital processing sub-block 742 are sent to input 711A, input 711B, input 713, and input 714 of digital processing sub-block 744, respectively. Output 715, output 716A, and output 716B of digital processing sub-block 744 are sent to input 705, input 706A, and input 706B of digital processing sub-block 742, respectively. Output 721A, output 722, output 723, and output 721B of digital processing sub-block 744 are sent to orientation and position calculation block 150.

Refer to FIG. 7B and FIG. 7C for details of digital processing block 740. The outputs of the combined multiplier 750 are the in-phase multiplier output i, the quadrature multiplier output q, and the code multiplier output di. The in-phase multiplier output i is inputted into accumulator 762. The output of accumulator 762 (common in-phase correlation signal I) is not switched. The output of accumulator 762 is processed by data processing block 192; the output of data processing block 192 is sent to orientation and position calculation block 150.

The code multiplier output di is inputted into accumulator 764. The output of accumulator 764 (common code correlation signal dI) is not switched. The output of accumulator 764 is processed successively by discriminator 7112 and DLL loop filter 7114. The output of DLL loop filter 7114 is sent to orientation and position calculation block 150.

The quadrature multiplier output q is inputted into accumulator 760. The output of accumulator 760 (quadrature correlation signal Q) is fed into input port 772 of separator switch 770. In response to clock signal 161, the output of separator switch 770 switches between output port 774A and output port 774B. Antenna multiplexer switch 110, separator switch 770, and commutator switch 780 (see below) switch synchronously.

When the signals from antenna unit A 104A are being processed, the output of separator switch 770 is switched to output port 774A, and the corresponding quadrature correlation signal $Q_A$ is processed successively by screening block 7102A, discriminator 7104A, and PLL loop filter 7106A. The output of PLL loop filter 7106A is sent to orientation and position calculation block 150. When the signals from antenna unit B 104B are being processed, the output of separator switch 770 is switched to output port 774B, and the corresponding quadrature correlation signal $Q_B$ is processed successively by screening block 7102B, discriminator 7104B, and PLL loop filter 7106B. The output of PLL loop filter 7106B is sent to orientation and position calculation block 150. As discussed above, the screening blocks eliminate invalid measurements from further processing.

For the code and strobe NCO 752, the output of DLL loop filter 7114 is used for the input control signal. For the carrier NCO 754, the input control signal is the output of extrapolator 7116A when processing signals from antenna unit A 104A and the output of extrapolator 7116B when processing signals from antenna unit B 104B. The output of extrapolator 7116A is fed into input port 784A of commutator switch 780, and the output of extrapolator 7116B is fed into input port 784B. In response to clock signal 161, the output port 782 (which feeds carrier NCO 754) switches between the input port 784A and the input port 784B.

Figure 9A:
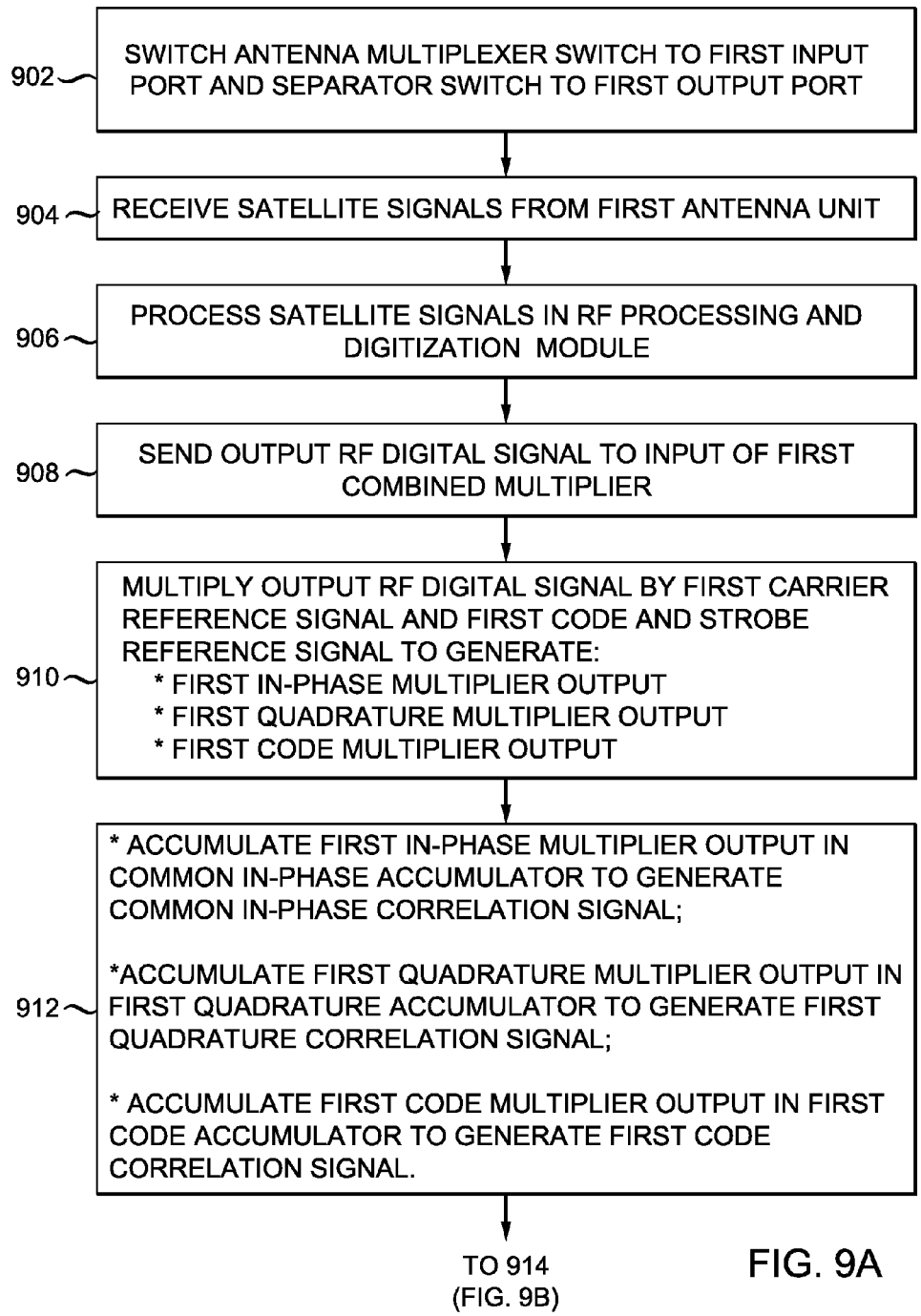
FIG. 9 shows a flowchart of a method for processing satellite signals received by a set of antenna units.
Figure 9C:
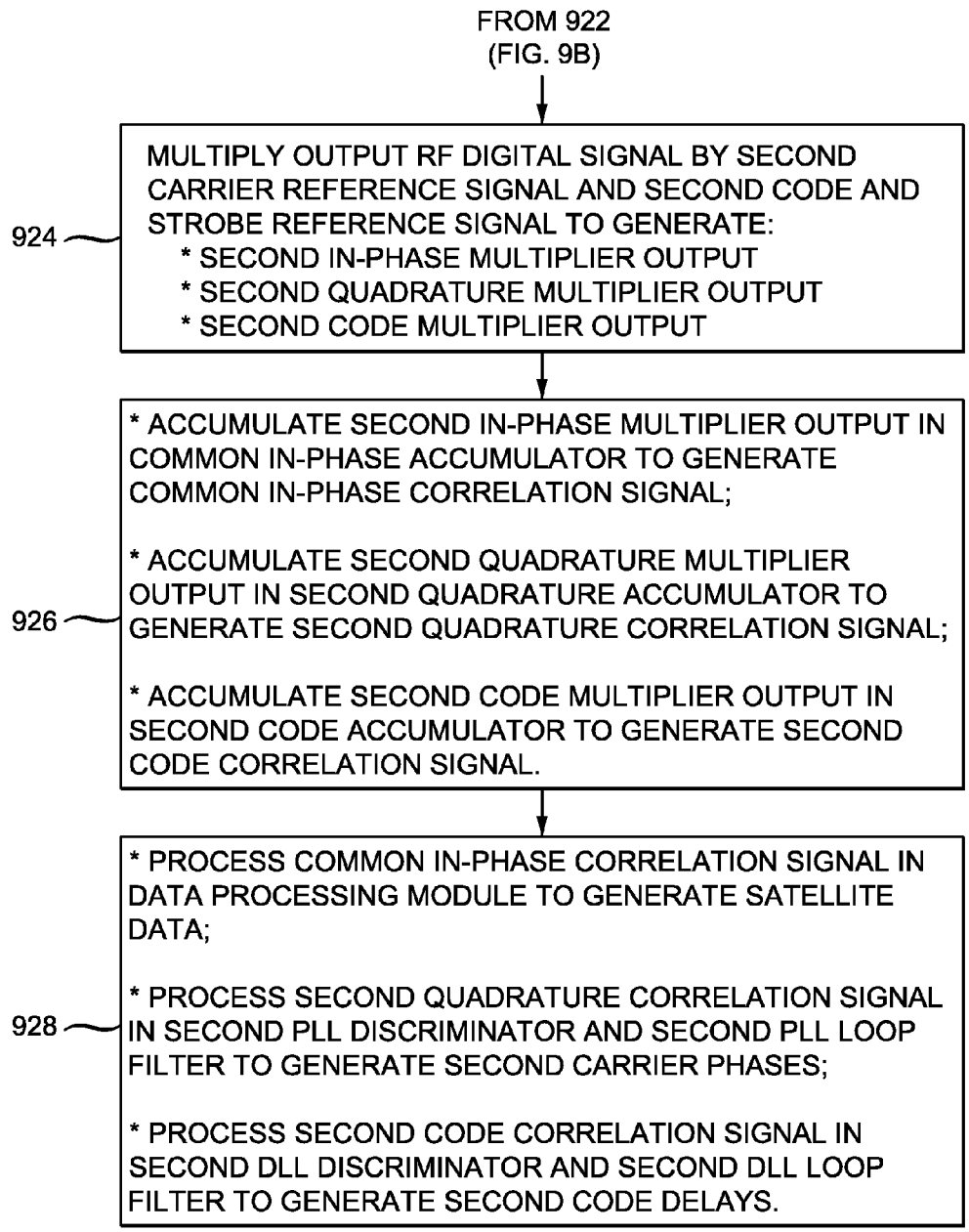

The flowchart shown in FIG. 9A-FIG. 9C summarizes an embodiment of a method for processing satellite signals received by set of antenna units. The method corresponds to the functional block diagrams shown in FIG. 1A and FIG. 1B. In the flowchart, "first" corresponds to systems, and system elements, for processing satellite signals received from global navigation satellites by antenna unit A 104A and "second" corresponds to systems, and system elements, for processing satellite signals received from global navigation satellites by antenna unit B 104B. As discussed earlier, one skilled in the art may develop embodiments of the invention to process satellite signals received by a set of antennas with N antenna units. In the discussion below, the functional blocks in FIG. 1A and FIG. 1B are referred to by the equivalent modules which implement their functions (the same callout reference numbers are retained).

In step 902, antenna multiplexer switch 110 is switched to the first input port 112A, and the separator switch 130 is switched to the first output port 134A. In step 904, satellite signals are received from the first antenna unit 104A and, in step 906, processed by RF processing and digitization module 120. The process then passes to step 908, in which the RF processed and digitized signal (output RF digital signal 121) is sent to the input 141A of the first combined multiplier 174A.

The process then passes to step 910 in which the output RF digital signal 121 is multiplied by a first carrier reference signal generated by the first carrier NCO 176A and by a first code and strobe reference signal generated by the first code and strobe NCO 172A. The multiplication processes produce the following outputs: a first in-phase multiplier output, a first quadrature multiplier output, and a first code multiplier output.

The process then passes to step 912. The first in-phase multiplier output is accumulated in the common accumulator 190 to generate a common in-phase correlation signal. The first quadrature multiplier output is accumulated in the first quadrature accumulator 180A to generate a first quadrature correlation signal. The first code multiplier output is accumulated in the first code accumulator 178A to generate a first code correlation signal.

The process then passes to step 914. The common in-phase correlation signal is processed by data processing module 192 to generate information symbols containing satellite data; these information symbols are sent to orientation and position calculation module 150. The first quadrature correlation signal, along with the common in-phase correlation signal, is processed successively by the first PLL discriminator 184A and the first PLL loop filter 188A to generate first carrier phases, which are sent to orientation and position calculation module 150. The output of the first PLL loop filter 188A is also sent as an input control signal to first carrier NCO 176A. The first code correlation signal, along with the common in-phase correlation signal, is processed successively by the first DLL discriminator 182A and the first DLL loop filter 186A to generate first code delays, which are sent to orientation and position calculation module 150. The output of the first DLL loop filter 186A is also sent as an input control signal to the first code and strobe NCO 172A.

The process then passes to step 916, in which antenna multiplexer switch 110 is switched to the second input port 112B, and the separator switch 130 is switched to the second output port 134B. In step 918, satellite signals are received from the second antenna unit 104B and, in step 920, processed by RF processing and digitization module 120. The process then passes to step 922, in which the RF processed and digitized signal (output RF digital signal 121) is sent to the input 141B of the second combined multiplier 174B.

The process then passes to step 924 in which the output RF digital signal 121 is multiplied by a second carrier reference signal generated by the second carrier NCO 176B and by a second code and strobe reference signal generated by the second code and strobe NCO 172B. The multiplication processes produce the following outputs: a second in-phase multiplier output, a second quadrature multiplier output, and a second code multiplier output.

The process then passes to step 926. The second in-phase multiplier output is accumulated in the common accumulator 190 to generate a common in-phase correlation signal. The second quadrature multiplier output is accumulated in the second quadrature accumulator 180B to generate a second quadrature correlation signal. The second code multiplier output is accumulated in the second code accumulator 178B to generate a second code correlation signal.

The process then passes to step 928. The common in-phase correlation signal is processed by data processing module 192 to generate information symbols containing satellite data; these information symbols are sent to orientation and position calculation module 150. The second quadrature correlation signal, along with the common in-phase correlation signal, is processed successively by the second PLL discriminator 184B and the second PLL loop filter 188B to generate second carrier phases, which are sent to orientation and position calculation module 150. The output of the second PLL loop filter 188B is also sent as an input control signal to the second carrier NCO 176B. The second code correlation signal, along with the common in-phase correlation signal, is processed successively by the second DLL discriminator 182B and the second DLL loop filter 186B to generate second code delays, which are sent to orientation and position calculation module 150. The output of the second DLL loop filter 186B is also sent as an input control signal to the second code and strobe NCO 172B.

One skilled in the art can develop flowcharts, similar to the one shown in FIG. 9A-FIG. 9C, to summarize the embodiments corresponding to the functional schematics of FIG. 2A-FIG. 2C, FIG. 3A and FIG. 3B, FIG. 4A-FIG. 4C, FIG. 5A-FIG. 5C, FIG. 6A-FIG. 6C, and FIG. 7A-FIG. 7C.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A navigation receiver comprising:
   an antenna multiplexer switch configured to:
   sequentially receive global navigation satellite system (GNSS) signals from each specific antenna unit in a set of antenna units; and
   sequentially send the sequentially received GNSS signals;
   a radiofrequency (RF) and digitization module configured to:
   sequentially receive all the GNSS signals sequentially sent by the antenna multiplexer switch; and
   generate an output RF digital signal comprising a sequence of output RF digital signal segments, each specific output RF digital signal segment in the sequence of output RF digital signal segments corresponding to the GNSS signals received from a specific antenna unit; and
   a common in-phase correlator configured to receive all the output RF digital signal segments and generate a common in-phase correlation signal based at least in part on all the output RF digital signal segments.

2. The navigation receiver of claim 1, further comprising:
   a data processing module configured to generate satellite data based at least in part on the common in-phase correlation signal.

3. The navigation receiver of claim 1, further comprising:
   a plurality of phase-lock loops configured to generate carrier phase measurements based at least in part on the common in-phase correlation signal, each specific phase-lock loop in the plurality of phase-lock loops corresponding to a specific antenna unit; and
   a plurality of delay-lock loops configured to generate code delay measurements based at least in part on the common in-phase correlation signal, each specific delay-lock loop in the plurality of delay-lock loops corresponding to a specific antenna unit.

4. The navigation receiver of claim 3, further comprising:
   a plurality of carrier numerically controlled oscillators, each specific carrier numerically controlled oscillator in the plurality of carrier numerically controlled oscillators configured to generate specific carrier reference signals corresponding to a specific antenna unit; and
   a plurality of code and strobe numerically controlled oscillators, each specific code and strobe numerically controlled oscillator in the plurality of code and strobe numerically controlled oscillators configured to generate specific code and strobe reference signals corresponding to a specific antenna unit.

5. The navigation receiver of claim 4, further comprising:
   a separator switch configured to:
   receive all the output RF digital signal segments; and
   send the specific output RF digital signal segments corresponding to a specific antenna unit to a corresponding specific combined multiplier selected from a plurality of combined multipliers, wherein each specific combined multiplier is configured to:
   receive the specific output RF digital signal segments corresponding to a specific antenna unit;
   receive the specific carrier reference signals corresponding to the same specific antenna unit;
   receive the specific code and strobe reference signals corresponding to the same specific antenna unit;
   generate a specific in-phase multiplier output based at least in part on the specific output RF digital signal segments and the specific carrier and code reference signals;
   generate a specific quadrature multiplier output based at least in part on the specific output RF digital signal segments and the specific carrier and code reference signals; and
   generate a specific code multiplier output based at least in part on the specific output RF digital signal segments and the specific carrier and strobe reference signals;
   a common in-phase accumulator configured to:
   receive all the in-phase multiplier outputs from all the combined multipliers; and
   generate the common in-phase correlation signal based at least in part on all the in-phase multiplier outputs;
   a plurality of quadrature accumulators, each specific quadrature accumulator in the plurality of quadrature accumulators configured to:
   receive a specific quadrature multiplier output from a corresponding specific combined multiplier; and
   generate a specific quadrature correlation signal based at least in part on the specific quadrature multiplier output; and
   a plurality of code accumulators, each specific code accumulator in the plurality of code accumulators configured to:
   receive a specific code multiplier output from a corresponding specific combined multiplier; and
   generate a specific code correlation signal based at least in part on the specific code multiplier output.

6. The navigation receiver of claim 4, further comprising:
   a plurality of combined multipliers, each specific combined multiplier in the plurality of combined multipliers corresponding to a specific antenna unit and configured to:
   receive all the output RF digital signal segments;
   receive the specific carrier reference signals corresponding to a specific antenna unit;
   receive the specific code and strobe reference signals corresponding to the same specific antenna unit;
   generate a specific in-phase multiplier output based at least in part on all the output RF digital signal segments and the specific carrier and code reference signals;
   generate a specific quadrature multiplier output based at least in part on all the output RF digital signal segments and the specific carrier and code reference signals; and
   generate a specific code multiplier output based at least in part on all the output RF digital signal segments and the specific carrier and strobe reference signals.

7. The navigation receiver of claim 6, further comprising:
   a plurality of separator switches, each specific separator switch in the plurality of separator switches corresponding to a specific antenna unit and configured to:
   receive the specific in-phase multiplier output from the specific combined multiplier corresponding to a specific antenna unit and send specific in-phase multiplier output segments corresponding to the same antenna unit to a common in-phase accumulator, wherein the common in-phase accumulator is configured to generate the common in-phase correlation signal based at least in part on all the in-phase multiplier output segments received from all the combined multipliers;

receive the specific quadrature multiplier output from the same specific combined multiplier corresponding to the same antenna unit and send specific quadrature multiplier output segments corresponding to the same antenna unit to a corresponding specific quadrature accumulator selected from a plurality of quadrature accumulators, wherein the corresponding specific quadrature accumulator is configured to generate a corresponding specific quadrature correlation signal based at least in part on the specific quadrature multiplier output segments; and receive the specific code multiplier output from the same specific combined multiplier corresponding to the same antenna unit and send specific code multiplier output segments corresponding to the same antenna unit to a corresponding specific code accumulator selected from a plurality of code accumulators, wherein the corresponding specific code accumulator is configured to generate a corresponding specific code correlation signal based at least in part on the specific code multiplier output segments.

8. The navigation receiver of claim 6, further comprising:
a plurality of in-phase accumulators, each specific in-phase accumulator in the plurality of in-phase accumulators corresponding to a specific antenna unit and configured to receive the specific in-phase multiplier output from the specific combined multiplier corresponding to the same antenna unit and generate a specific in-phase correlation signal based at least in part on the specific in-phase multiplier output;

a plurality of quadrature accumulators, each specific quadrature accumulator in the plurality of quadrature accumulators corresponding to a specific antenna unit and configured to receive the specific quadrature multiplier output from the specific combined multiplier corresponding to the same antenna unit and generate a specific quadrature correlation signal based at least in part on the specific quadrature multiplier output;

a plurality of code accumulators, each specific code accumulator in the plurality of code accumulators corresponding to a specific antenna unit and configured to receive the code multiplier output from the specific combined multiplier corresponding to the same antenna unit and generate a specific code correlation signal based at least in part on the specific code multiplier output;

a plurality of separator switches, each specific separator switch in the plurality of separator switches corresponding to a specific antenna unit and configured to:
receive the specific in-phase correlation signal from the specific in-phase accumulator corresponding to the same antenna unit and send specific in-phase correlation signal segments corresponding to the same antenna unit to a corresponding specific in-phase screening module selected from a plurality of in-phase screening modules, wherein the corresponding specific in-phase screening module is configured to:
receive the specific in-phase correlation signal segments;
remove invalid values of the specific in-phase correlation signal segments; and
output valid values of the specific in-phase correlation signal segments;
receive the specific quadrature correlation signal from the specific quadrature accumulator corresponding to the same antenna unit and send specific quadrature correlation signal segments corresponding to the same antenna unit to a corresponding specific quadrature screening module selected from a plurality of quadrature screening modules, wherein the corresponding specific quadrature screening module is configured to:
receive the specific quadrature correlation signal segments;
remove invalid values of the specific quadrature correlation signal segments; and
output valid values of the specific quadrature correlation signal segments; and
receive the specific code correlation signal from the specific code accumulator corresponding to the same antenna unit and send specific code correlation signal segments corresponding to the same antenna unit to a corresponding specific code screening module selected from a plurality of code screening modules, wherein the specific code screening module is configured to:
receive the specific code correlation signal segments;
remove invalid values of the specific code correlation signal segments; and
output valid values of the specific code correlation signal segments; and
a summing junction configured to generate the common in-phase correlation signal by summing all the valid values of the in-phase correlation signals outputted by all the in-phase screening modules.

9. The navigation receiver of claim 3, further comprising:
a common carrier numerically controlled oscillator configured to generate carrier reference signals in response to input carrier phase measurements;
a common code and strobe numerically controlled oscillator configured to generate code and strobe reference signals in response to input code delay measurements; and
a common combined multiplier configured to:
receive the carrier reference signals;
receive the code and strobe reference signals;
receive all the output RF digital signal segments;
generate an in-phase multiplier output based at least in part on all the output RF digital signal segments and the carrier and code reference signals;
generate a quadrature multiplier output based at least in part on all the output RF digital signal segments and the carrier and code reference signals; and
generate a code multiplier output based at least in part on all the output RF digital signal segments and the carrier and strobe reference signals; and
a common in-phase accumulator configured to receive the in-phase multiplier output and generate the common in-phase correlation signal.

10. The navigation receiver of claim 9, further comprising:
a quadrature separator switch configured to:
receive the quadrature multiplier output; and
send specific quadrature multiplier output segments corresponding to a specific antenna unit to a corresponding specific quadrature accumulator selected from a plurality of quadrature accumulators; and a code separator switch configured to:
  receive the code multiplier output; and
  send specific code multiplier output segments corresponding to a specific antenna unit to a corresponding specific code accumulator selected from a plurality of code accumulators.

11. The navigation receiver of claim 10, further comprising:
a carrier commutator switch configured to:
  sequentially receive specific carrier phase measurements from each specific phase-lock loop in the plurality of phase-lock loops; and
  sequentially send the received specific carrier phase measurements to the common carrier numerically controlled oscillator; and
a code and strobe commutator switch configured to:
  sequentially receive specific code delay measurements from each specific delay-lock loop in the plurality of delay-lock loops; and
  sequentially send the received specific code delay measurements to the common code and strobe numerically controlled oscillator.

12. The navigation receiver of claim 10, further comprising:
a plurality of carrier phase extrapolators, each specific carrier phase extrapolator in the plurality of carrier phase extrapolators configured to:
  receive specific carrier phase measurements from a corresponding specific phase-lock loop; and
  generate specific extrapolated carrier phase measurements based at least in part on the specific carrier phase measurements;
a plurality of code delay extrapolators, each specific code delay extrapolator in the plurality of code delay extrapolators configured to:
  receive specific code delay measurements from a corresponding specific delay-lock loop; and
  generate specific extrapolated code delay measurements based at least in part on the specific code delay measurements;
a carrier commutator switch configured to:
  sequentially receive specific extrapolated carrier phase measurements from each specific phase-lock loop in the plurality of phase-lock loops; and
  sequentially send the received specific extrapolated carrier phase measurements to the common carrier numerically controlled oscillator; and
a code and strobe commutator switch configured to:
  sequentially receive specific extrapolated code delay measurements from each specific delay-lock loop in the plurality of delay-lock loops; and
  sequentially send the received specific extrapolated code delay measurements to the common code and strobe numerically controlled oscillator.

13. The navigation receiver of claim 9, further comprising:
a common quadrature accumulator configured to receive the quadrature multiplier output and generate a common quadrature correlation signal based at least in part on the quadrature multiplier output;
a common code accumulator configured to receive the code multiplier output and generate a common code correlation signal based at least in part on the code multiplier output;
a quadrature separator switch configured to:
  receive the common quadrature correlation signal; and
  send specific quadrature correlation signal segments corresponding to a specific antenna unit to a corresponding specific quadrature screening module selected from a plurality of quadrature screening modules, wherein the corresponding specific quadrature screening module is configured to:
    receive the specific quadrature correlation signal segments;
    remove invalid values of the specific quadrature correlation signal segments; and
    output valid values of the specific quadrature correlation signal segments; and
a code separator switch configured to:
  receive the common code correlation signal; and
  send specific code correlation signal segments corresponding to a specific antenna unit to a corresponding specific code screening module selected from a plurality of code screening modules, wherein the specific code screening module is configured to:
    receive the specific code correlation signal segments;
    remove invalid values of the specific code correlation signal segments; and
    output valid values of the specific code correlation signal segments.

14. The navigation receiver of claim 13, further comprising:
a carrier commutator switch configured to:
  sequentially receive specific carrier phase measurements from each specific phase-lock loop in the plurality of phase-lock loops; and
  sequentially send the received specific carrier phase measurements to the common carrier numerically controlled oscillator; and
a code and strobe commutator switch configured to:
  sequentially receive specific code delay measurements from each specific delay-lock loop in the plurality of delay-lock loops; and
  sequentially send the received specific code delay measurements to the common code and strobe numerically controlled oscillator.

15. The navigation receiver of claim 13, further comprising:
a plurality of carrier phase extrapolators, each specific carrier phase extrapolator in the plurality of carrier phase extrapolators configured to:
  receive specific carrier phase measurements from a corresponding specific phase-lock loop; and
  generate specific extrapolated carrier phase measurements based at least in part on the specific carrier phase measurements;
a plurality of code delay extrapolators, each specific code delay extrapolator in the plurality of code delay extrapolators configured to:
  receive specific code delay measurements from a corresponding specific delay-lock loop; and
  generate specific extrapolated code delay measurements based at least in part on the specific code delay measurements;
a carrier commutator switch configured to:
  sequentially receive specific extrapolated carrier phase measurements from each specific phase-lock loop in the plurality of phase-lock loops; and
  sequentially send the received specific extrapolated carrier phase measurements to the common carrier numerically controlled oscillator; and
a code and strobe commutator switch configured to:
  sequentially receive specific extrapolated code delay measurements from each specific delay-lock loop in the plurality of delay-lock loops; and sequentially send the received specific extrapolated code delay measurements to the common code and strobe numerically controlled oscillator.

16. The navigation receiver of claim 1, further comprising:
a plurality of phase-lock loops configured to generate carrier phase measurements based at least in part on the common in-phase correlation signal, each specific phase-lock loop in the plurality of phase-lock loops corresponding to a specific antenna unit; and
a common delay-lock loop configured to generate code delay measurements based at least in part on the common in-phase correlation signal.

17. The navigation receiver of claim 16, further comprising:
a common carrier numerically controlled oscillator configured to generate carrier reference signals in response to input carrier phase measurements;
a common code and strobe numerically controlled oscillator configured to generate code and strobe reference signals in response to input code delay measurements;
a common combined multiplier configured to:
receive the carrier reference signals;
receive the code and strobe reference signals;
receive all the output RF digital signal segments;
generate an in-phase multiplier output based at least in part on all the output RF digital signal segments and the carrier and code reference signals;
generate a quadrature multiplier output based at least in part on all the output RF digital signal segments and the carrier and code reference signals; and
generate a code multiplier output based at least in part on all the output RF digital signal segments and the carrier and strobe reference signals;
a common in-phase accumulator configured to receive the in-phase multiplier output and generate the common in-phase correlation signal based at least in part on the in-phase multiplier output; and
a common code accumulator configured to receive the in-phase multiplier output and generate a common code correlation signal based at least in part on the code multiplier output.

18. The navigation receiver of claim 17, further comprising:
a quadrature separator switch configured to:
receive the quadrature multiplier output; and
send specific quadrature multiplier output segments corresponding to a specific antenna unit to a corresponding specific quadrature accumulator selected from a plurality of quadrature accumulators, wherein the corresponding specific quadrature accumulator is configured to generate a specific quadrature correlation signal based at least in part on the specific quadrature multiplier output segments.

19. The navigation receiver of claim 18, further comprising:
a carrier commutator switch configured to:
sequentially receive specific carrier phase measurements from each specific phase-lock loop in the plurality of phase-lock loops; and
sequentially send the received specific carrier phase measurements to the common carrier numerically controlled oscillator;
wherein:
the common code and strobe numerically controlled oscillator is further configured to receive common code delay measurements from the common delay-lock loop.

20. The navigation receiver of claim 18, further comprising:
a plurality of carrier phase extrapolators, each specific carrier phase extrapolator in the plurality of carrier phase extrapolators configured to:
receive specific carrier phase measurements from a corresponding specific phase-lock loop; and
generate specific extrapolated carrier phase measurements based at least in part on the specific carrier phase measurements; and
a carrier commutator switch configured to:
sequentially receive specific extrapolated carrier phase measurements from each specific phase-lock loop in the plurality of phase-lock loops; and
sequentially send the received specific extrapolated carrier phase measurements to the common carrier numerically controlled oscillator;
wherein:
the common code and strobe numerically controlled oscillator is further configured to receive common code delay measurements from the common delay-lock loop.

21. The navigation receiver of claim 17, further comprising:
a common quadrature accumulator configured to receive the quadrature multiplier output and generate a common quadrature correlation signal based at least in part on the quadrature multiplier output; and
a quadrature separator switch configured to:
receive the common quadrature correlation signal; and
send specific quadrature correlation signal segments corresponding to a specific antenna unit to a corresponding specific quadrature screening module selected from a plurality of quadrature screening modules, wherein the corresponding specific quadrature screening module is configured to:
receive the specific quadrature correlation signal segments;
remove invalid values of the specific quadrature correlation signal segments; and
output valid values of the specific quadrature correlation signal segments.

22. The navigation receiver of claim 21, further comprising:
a carrier commutator switch configured to:
sequentially receive specific extrapolated carrier phase measurements from each specific phase-lock loop in the plurality of phase-lock loops; and
sequentially send the received specific extrapolated carrier phase measurements to the common carrier numerically controlled oscillator;
wherein:
the common code and strobe numerically controlled oscillator is further configured to receive common code delay measurements from the common delay-lock loop.

23. The navigation receiver of claim 21, further comprising:
a plurality of carrier phase extrapolators, each specific carrier phase extrapolator in the plurality of carrier phase extrapolators configured to:
receive specific carrier phase measurements from a corresponding specific phase-lock loop; and
generate specific extrapolated carrier phase measurements based at least in part on the specific carrier phase measurements; and a carrier commutator switch configured to:
  sequentially receive specific extrapolated carrier phase measurements from each specific phase-lock loop in the plurality of phase-lock loops; and
  sequentially send the received specific extrapolated carrier phase measurements to the common carrier numerically controlled oscillator;
wherein:
  the common code and strobe numerically controlled oscillator is further configured to receive common code delay measurements from the common delay-lock loop.

24. A method for processing global navigation satellite system (GNSS) signals received by a set of antenna units, the method comprising the steps of:
  sequentially receiving the GNSS signals from each specific antenna unit in the set of antenna units;
  generating an output radiofrequency (RF) digital signal comprising a sequence of output RF digital signal segments, each specific output RF digital signal segment in the sequence of output RF digital signal segments corresponding to the GNSS signals received from a specific antenna unit; and
  generating a common in-phase correlation signal based at least in part on all the output RF digital signal segments.

25. The method of claim 24, further comprising the step of:
  generating satellite data based at least in part on the common in-phase correlation signal.

26. The method of claim 24, further comprising the steps of:
  generating a plurality of phase-lock loops configured to generate carrier phase measurements based at least in part on the common in-phase correlation signal, each specific phase-lock loop in the plurality of phase-lock loops corresponding to a specific antenna unit; and
  generating a plurality of delay-lock loops configured to generate code delay measurements based at least in part on the common in-phase correlation signal, each specific delay-lock loop in the plurality of delay-lock loops corresponding to a specific antenna unit.

27. The method of claim 26, further comprising the steps of:
  generating a plurality of carrier reference signals, each specific carrier reference signal in the plurality of carrier reference signals corresponding to a specific antenna unit; and
  generating a plurality of code and strobe reference signals, each specific code signal and each specific strobe signal in the plurality of code and strobe reference signals corresponding to a specific antenna unit.

28. The method of claim 24, further comprising the steps of:
  generating a plurality of phase-lock loops configured to generate carrier phase measurements based at least in part on the common in-phase correlation signal, each specific phase-lock loop in the plurality of phase-lock loops corresponding to a specific antenna unit; and
  generating a common delay-lock loop configured to generate code delay measurements based at least in part on the common in-phase correlation signal.

29. An apparatus for processing global navigation satellite system (GNSS) signals received by a set of antenna units, the apparatus comprising:
  means for sequentially receiving the GNSS signals from each specific antenna unit in the set of antenna units;
  means for generating an output radiofrequency (RF) digital signal comprising a sequence of output RF digital signal segments, each specific output RF digital signal segment in the sequence of output RF digital signal segments corresponding to the GNSS signals received from a specific antenna unit; and
  means for generating a common in-phase correlation signal based at least in part on all the output RF digital signal segments.

30. The apparatus of claim 29, further comprising:
  means for generating satellite data based at least in part on the common in-phase correlation signal.

31. The apparatus of claim 29, further comprising:
  means for generating a plurality of phase-lock loops configured to generate carrier phase measurements based at least in part on the common in-phase correlation signal, each specific phase-lock loop in the plurality of phase-lock loops corresponding to a specific antenna unit; and
  means for generating a plurality of delay-lock loops configured to generate code delay measurements based at least in part on the common in-phase correlation signal, each specific delay-lock loop in the plurality of delay-lock loops corresponding to a specific antenna unit.

32. The apparatus of claim 31, further comprising:
  means for generating a plurality of carrier reference signals, each specific carrier reference signal in the plurality of carrier reference signals corresponding to a specific antenna unit; and
  means for generating a plurality of code and strobe reference signals, each specific code signal and each specific strobe signal in the plurality of code and strobe reference signals corresponding to a specific antenna unit.

33. The apparatus of claim 29, further comprising:
  means for generating a plurality of phase-lock loops configured to generate carrier phase measurements based at least in part on the common in-phase correlation signal, each specific phase-lock loop in the plurality of phase-lock loops corresponding to a specific antenna unit; and
  means for generating a common delay-lock loop configured to generate code delay measurements based at least in part on the common in-phase correlation signal.

* * * * *